Figure 1:
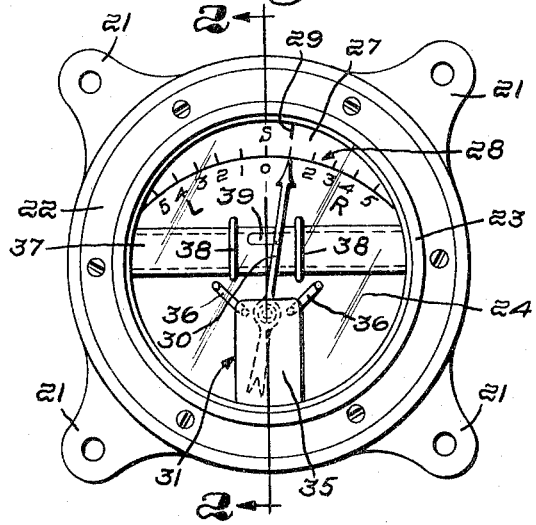

Dec. 6, 1966 R. W. KENYON 3,289,475
BLIND FLIGHT WITHOUT GYROS, METHODS AND INSTRUMENTS
Filed Aug. 14, 1963 9 Sheets-Sheet 1

Inventor:
Ralph W. Kenyon,
by Abl__ Spear,
Attorney

Dec. 6, 1966 R. W. KENYON 3,289,475
BLIND FLIGHT WITHOUT GYROS, METHODS AND INSTRUMENTS
Filed Aug. 14, 1963 9 Sheets-Sheet 2

Inventor:
Ralph W. Kenyon,
by Abbot Spear,
Attorney

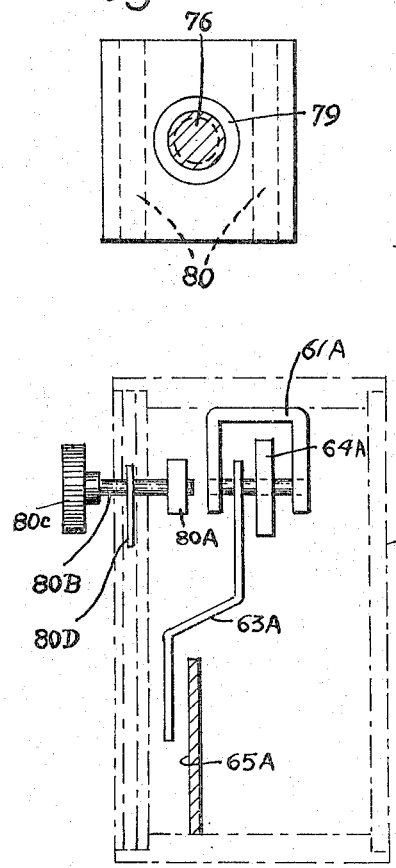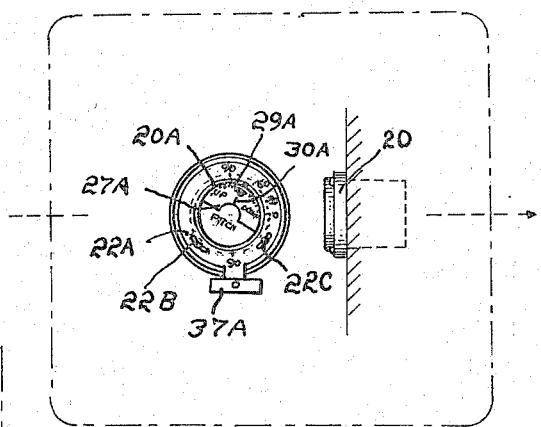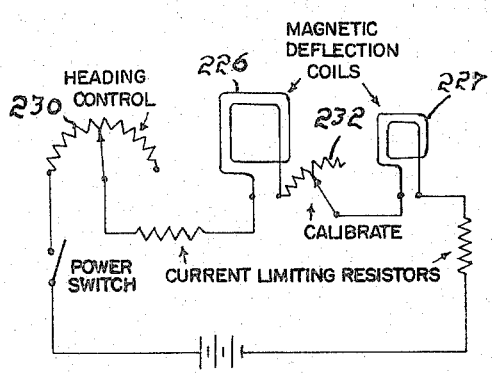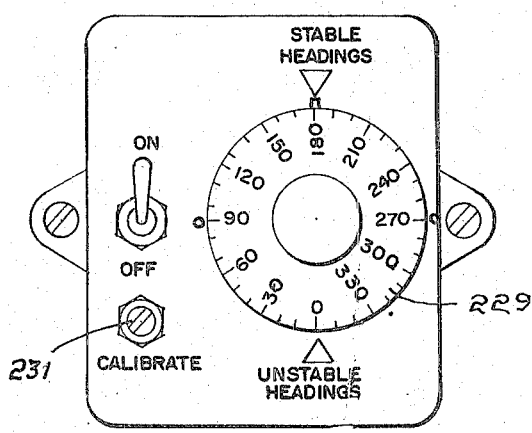

Dec. 6, 1966 R. W. KENYON 3,289,475
BLIND FLIGHT WITHOUT GYROS, METHODS AND INSTRUMENTS
Filed Aug. 14, 1963 9 Sheets-Sheet 4
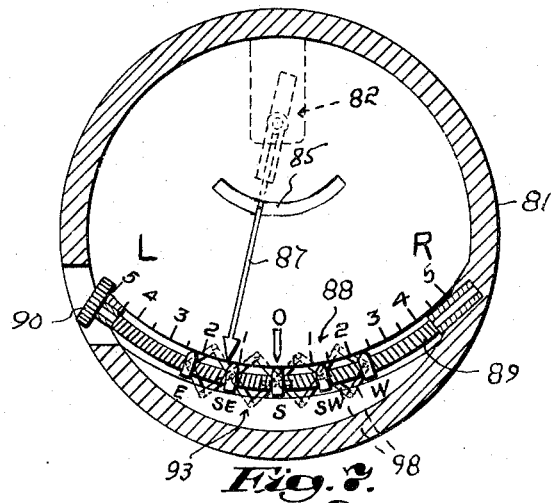
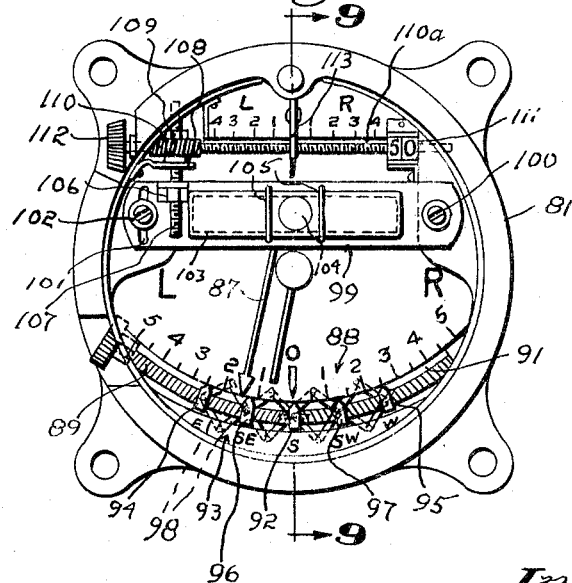
Inventor:
Ralph W. Kenyon,
by Abbott Spear,
Attorney

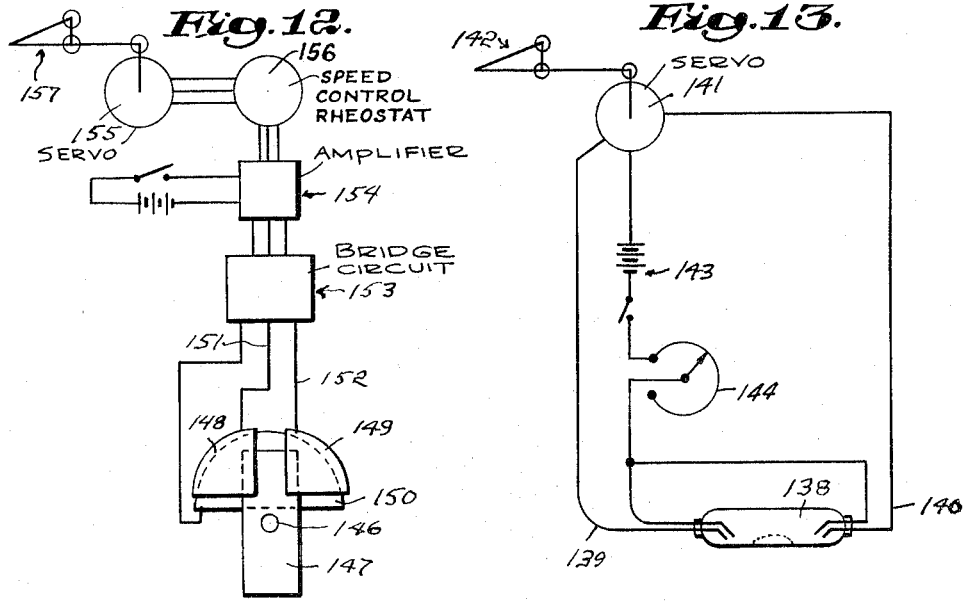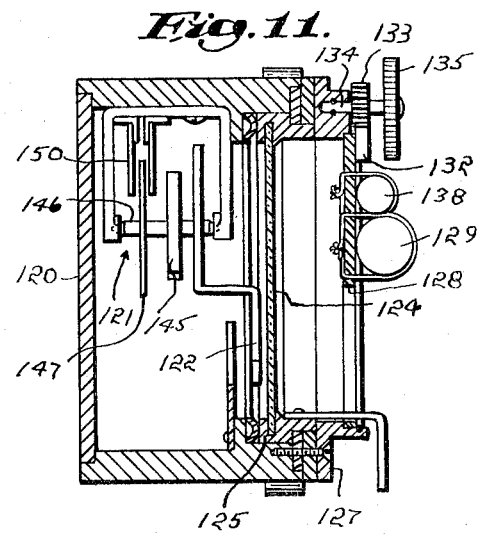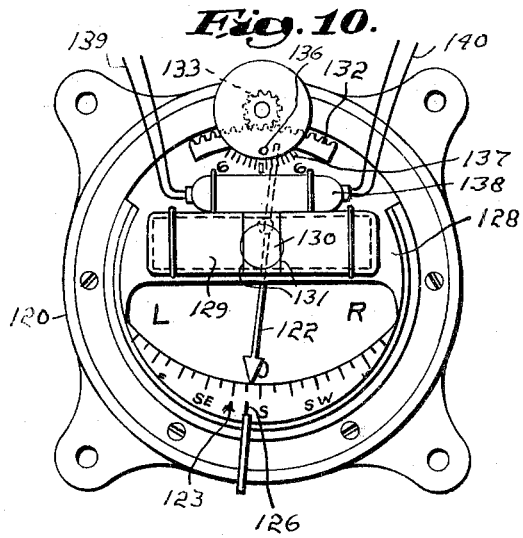

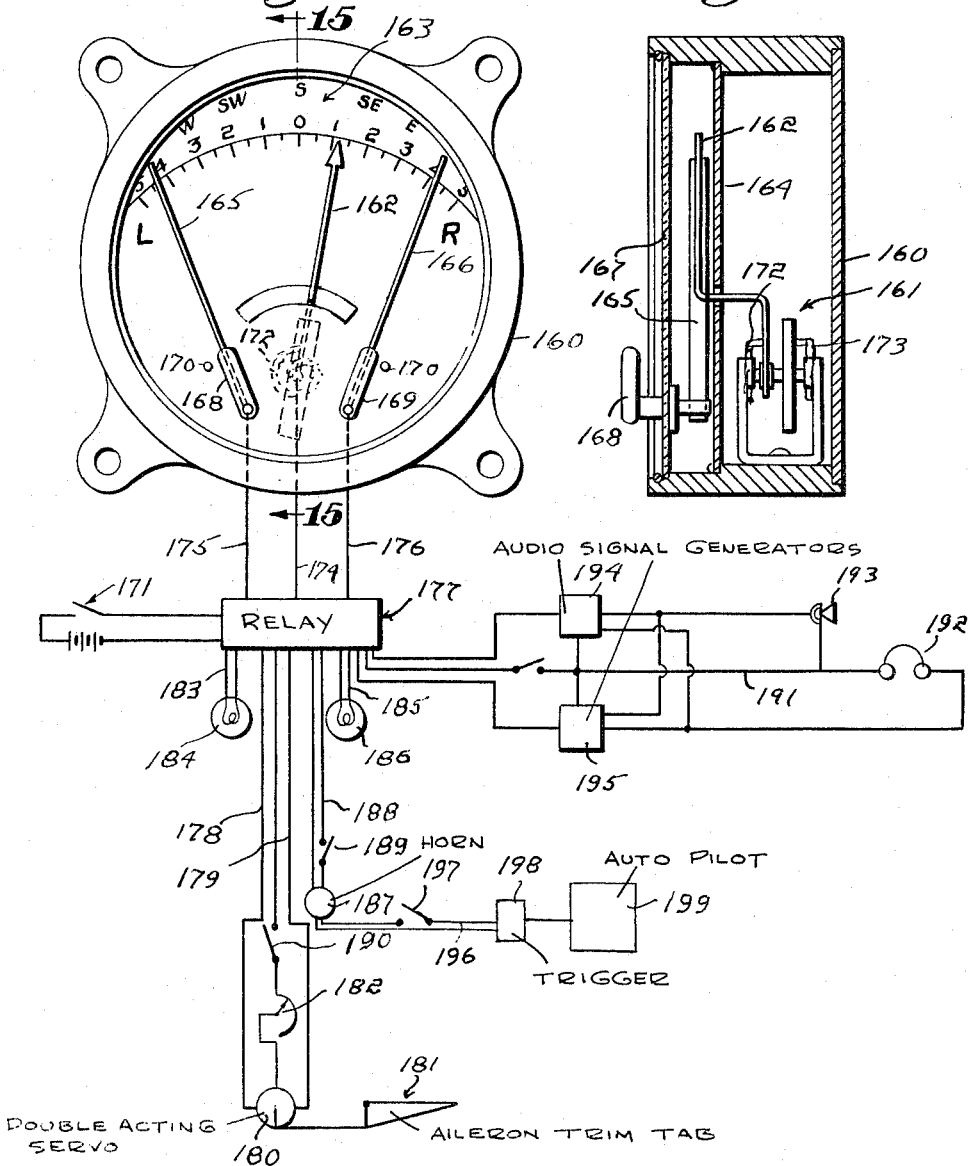

Dec. 6, 1966 R. W. KENYON 3,289,475
BLIND FLIGHT WITHOUT GYROS, METHODS AND INSTRUMENTS
Filed Aug. 14, 1963 9 Sheets-Sheet 7

INVENTOR.
Ralph W. Kenyon
BY
Albt Spear,
Attorney

Dec. 6, 1966 R. W. KENYON 3,289,475
BLIND FLIGHT WITHOUT GYROS, METHODS AND INSTRUMENTS
Filed Aug. 14, 1963 9 Sheets-Sheet 8

Inventor:
Ralph W. Kenyon,
by
Attorney

INVENTOR
Ralph W. Kenyon,
BY,
Attorney

United States Patent Office 3,289,475
Patented Dec. 6, 1966

3,289,475
BLIND FLIGHT WITHOUT GYROS, METHODS AND INSTRUMENTS
Ralph W. Kenyon, 345 Linwood Ave., Newtonville, Mass.
Filed Aug. 14, 1963, Ser. No. 306,977
20 Claims. (Cl. 73—178)

The present invention relates to a basic new art, methods and instruments, using new principles, for the "instrument" flight and navigation of vehicles such as aircraft, with the basic instruments self-contained and needing no power or connections, in the usual sense, for their operation. The present application is a continuation-in-part of my copending application, Serial No. 743,201, filed June 19, 1958, now abandoned.

The invention relates to improvements in the art of guiding vehicles, whether manned or unmanned, by the use of new principles, methods, and apparatus as applied to maintaining and regaining spatial and directional control of a vehicle, guiding it along desired headings in azimuth, tracking a course to a desired latitude and longitude and distance measuring, by a passive guidance system that would not require exact knowledge as to the geographical starting position of the vehicle, build up substantial errors due to transmit time, or require external visual reference.

My methods and instruments can serve as a "standby" system of blind flight and navigation for use on any heading when conventional systems malfunction or become inoperative, or as a basic blind flight and navigation system. Presently used blind flight systems employ gyroscopes and gravity as their basic frames of reference. My methods and apparatus use two other frames of reference. In addition, my system offers much faster, simpler and more reliable spatial and directional orientation in terms of "what to do" than conventional blind flight systems, since part of the system comprises an instrument enabling a pilot to become quickly re-oriented and represents a basic new aeronautical life saving instrument in itself, using the earth's magnetic field in place of gravity for its frame of reference. The orientation instrument is insensitive to gravity and other accelerations and, in its simplest form, it consists of a magnet unit balanced against responding to accelerations, as such, and pivots to move transversely with respect to the fore-and-aft axis of the aircraft. More sophisticated utilizations use two such magnet units free to swing in angularly displaced vertical planes.

This is a completely new concept in terms of aircraft instrumentation, since its principal purpose is to orient a disoriented pilot much more rapidly, reliably and efficiently than conventional gyro instrument systems do. It is small, light, self-contained, portable and control of an aircraft in instrument weather can be maintained by its use, even if hand held. It is able to function thusly because it is "non-tumbling," insensitive to prolonged accelerations, and has a reflex action presentation that can be interpreted and utilized by a properly trained pilot without further thought, that is, as a reflex act. Merely centering a needle of the magnet unit by banking towards or away from the needle, whichever sensing is desired, automatically takes care of the bank, turn, roll and heading parameters, leaving only the "pitch" parameter to be controlled by other readily available means, in accordance with my method as described herein.

A system of blind flight without gyros in accordance with the invention represents the first completely new, practcal system of blind flight for several decades, and gives order of magnitude improvements in simplicity, reliability, low cost, light weight, small size, ease and rapdity of spatial and directional pilot orientation. It is the only passive blind flight system (needs no power supply). It gives virtually "instantaneous" orientation in terms of "what to do" to recover from emergency out of control situations (due to pilot disorientation, vertigo and the like, under instrument conditions), compared with the much longer orientation times required by presently used systems and apparatus that are also relatively unreliable and require a power supply.

By substantially reducing the time required for a disoriented pilot to instigate remedial action, the pilot's chances of survival in instrument weather should be greatly enhanced and aviation made much safer; as spatial and directional disorientation is a clear and present aviation danger that claims many lives each year, and for the year 1961, appeared to be the worst cause of fatal aircraft accidents in general aviation in the United States.

My system consists in part of two methods of maintaining control of aircraft, using two basic key instruments that can be used separately or in combination, in place of "state of the art" gyro blind flight instruments. One of these instruments is the previously referred to magnetic orientation instrument.

The second instrument is Newtonian in concept (obeys Newton's laws of motion) and it detects changes in the transverse and yaw components of acceleration acting on an aircraft and, when used with my method in combination with the characteristics of an aircraft and one aerodynamic instrument such as an airspeed indicator, enables blind flight without gyros on any heading.

By "yaw components" of acceleration (or of force) and by accelerations (or forces) "about the yaw axis" as used herein, I mean accelerations (or forces) such as to produce motion in a plane perpendicular to the yaw axis; and "pitch components" and "roll components" are to be understood as similarly related to the pitch and roll axes, respectively. The second instrument in its simplest form may be a ball or bubble in an approximately straight tube. My "Newtonian" instrument, hereinafter referred to as an accelerometer, uses as its frame of reference the inertial forces of the aircraft itself. It must be used with my inertial-aerodynamic method to accomplish this desirable result. The second instrument may be used with a magnetic orientation instrument or unit as will subsequently be explained.

With these instruments and related methods the following important results can be effected:

(1) Blind flight and guidance without gyros or power instruments becomes practical resulting in a third major system of blind flight.

(2) What appears to be the major cause of aircraft fatalities in United States general aviation—the out of control—weather accident (according to CAB statistics for 1961) could be greatly reduced, by use of my orientation instrument.

With reference to blind flight and guidance without gyros, there are several important methods, some of which are listed below.

(1) A method of blind flight without gyros involves the steps of detecting changes in the transverse and yaw components of acceleration of an aircraft in combination with the detection of changes in the longitudinal angle of attack with respect to the relative wind or as reflected by airspeed or vertical speed indications and the combining of the inertial and aerodynamic inputs by refraining from using the rudder controls so as to enable blind flight without gyros in any direction to be effected.

(2) Another method of blind flight without gyros utilizes the local direction of the earth's magnetic field to maintain or regain control of an aircraft in combination with a transversely swinging balanced magnet unit and the aerodynamic characteristics of an aircraft.

(3) Yet another method involves the balancing of the transverse and yaw components of aceleration on an aircraft in combination with aircraft control based on a magnetic heading indication with or without pitch control and with or without heading correction.

(4) A passive method of "tracking" a desired, known course over the earth's surface results from the use of isoclinal lines of magnetic latitude as "magnetic beams" that can be identified and followed by use of my method and instruments.

(5) A passive method of determining lines of position by magnetic means also is useable with the present invention.

(6) A method of distance measuring based on isoclinal lines of latitude is also provided for by the invention.

(7) A magnetically controlled "stable platform."

Since my invention uses basic new principles in the control and navigation of vehicles, such as aircraft, making possible a third major blind flight system and the only passive blind flight system; detailed explanations are necessary as there are many complex factors that are interrelated and must be taken into consideration for such a complete system of blind flight without gyros to be successful and these must be presented so that the invention may be fully understood.

The orientation instrument can also be used in place of a number of other aircraft instruments by use of the proper method, as part of my Blind Flight Without Gyros System. When properly calibrated, and installed it can also be used as the basic instrument for a passive guidance system to enable vehicles, such as aircraft, to track a known course over the earth's surface by means of isoclinal "Magnetic Beam" guidance that cannot be "jammed" or made inoperative by man made interference.

When used as an "Orientation" Indicator with the proper method, this instrument will enable a spatially and directionally disoriented pilot to regain and maintain control of his aircraft by means of an efficient "orientation cycle" that will take him from an "unusual attitude" such as a "graveyard spiral dive" or even inverted flight, into straight and (wings) level, right side up flight on a Southerly heading. Usually the proper method consists of centering the needle of the orientation instrument with the ailerons and/or rudder and using my method for "pitch" control. The orientation instrument integrates the roll, bank, turn and heading parameters into the movement of one needle. It does not directly integrate the "nose up" or "nose down" pitch parameter by itself, but this "pitch" parameter is taken care of by other passive, non-gyroscopic means as part of my blind flight without gyros method.

While the accelerometer must be used with another instrument, such as an air speed indicator or a balanced magnet unit, the balanced magnet unit may be used by itself or in combinations other than those involved in connection with blind flight without gyros.

In brief, some of the other important uses of the balanced magnet units are heading selectors and instruments for determining heading, pitch indicators also usable in distance measuring based on isoclinal degrees of latitude, magnetic beam followers, and magnetically controlled stable platforms.

In the accompanying drawings, there are shown illustrative embodiments of the invention from which these and other of its objectives, novel features, and advantages will be readily apparent.

Figure 2:
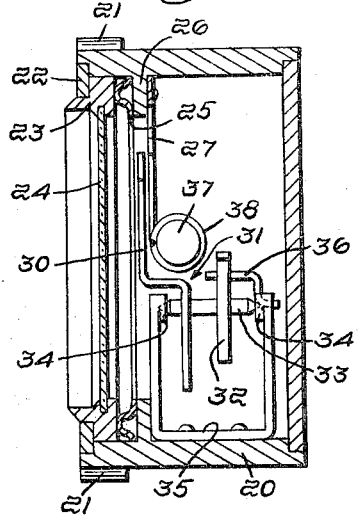
Figure 4:
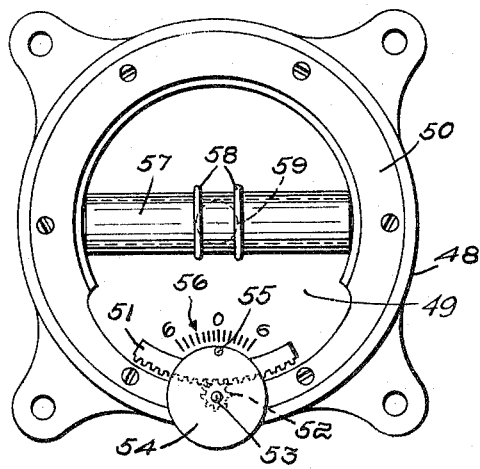
Figure 3:
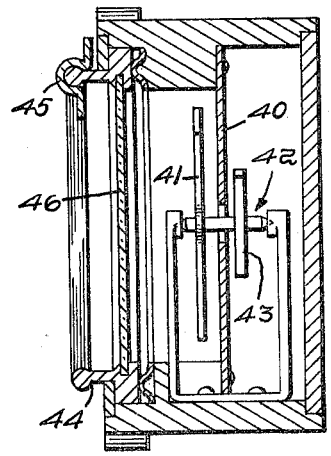
Figure 5:
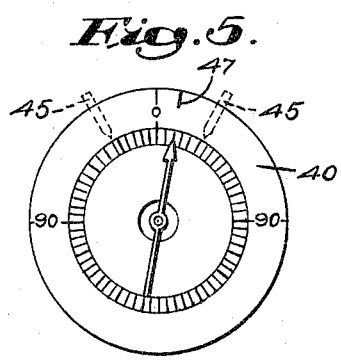
Figure 6:
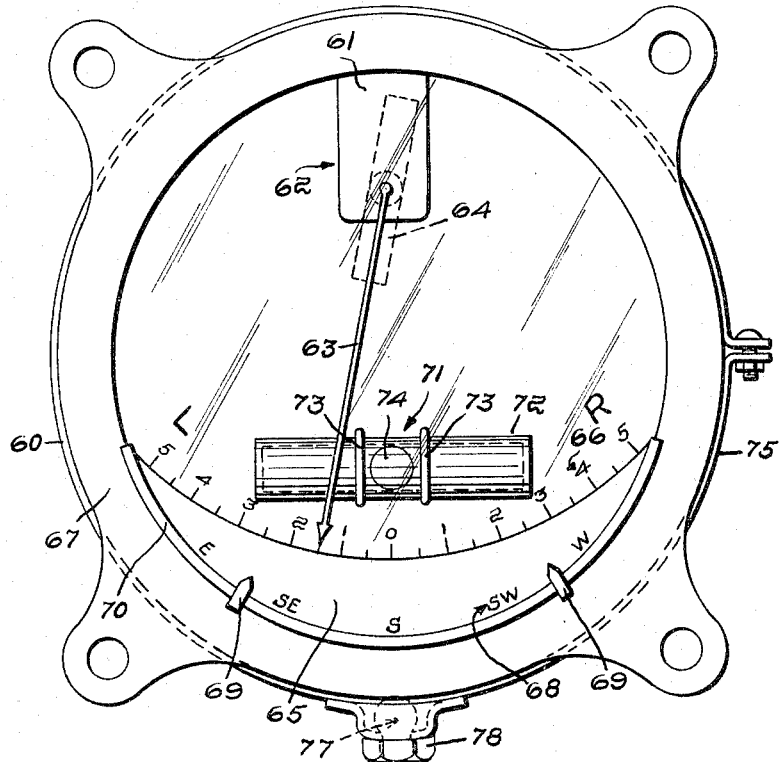
Figure 9:
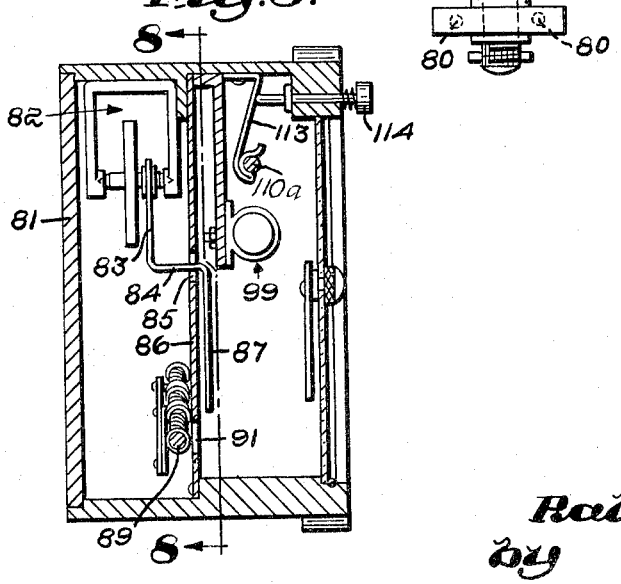
Figure 16:
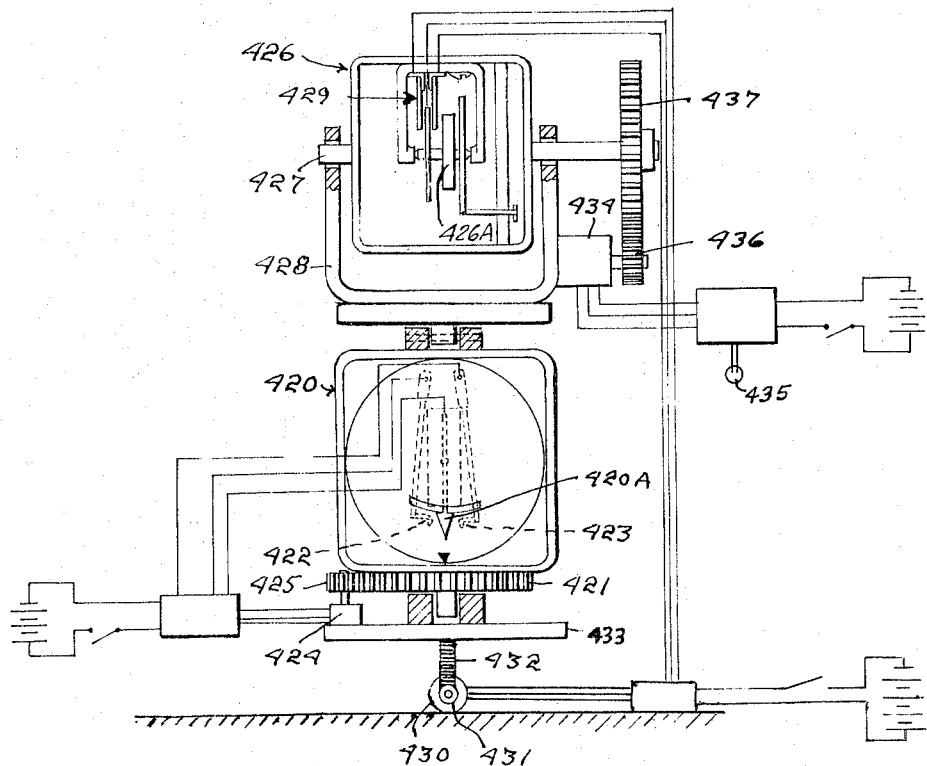
Figure 16A:
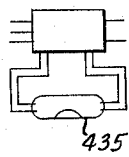
Figure 17:
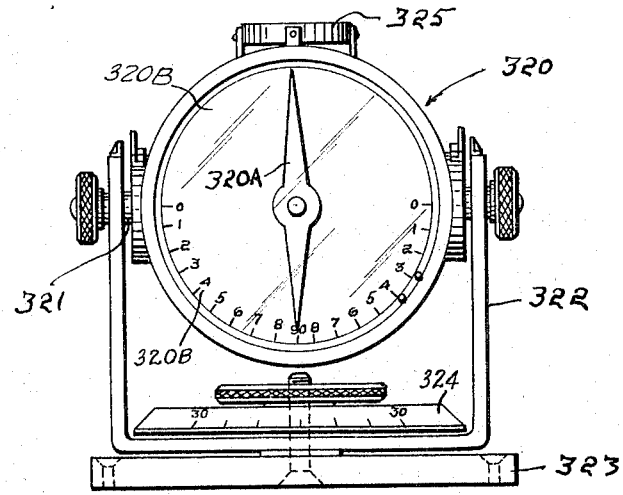
Figure 18:
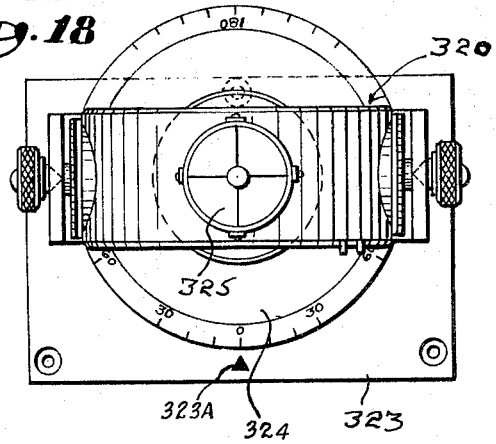
Figure 19:
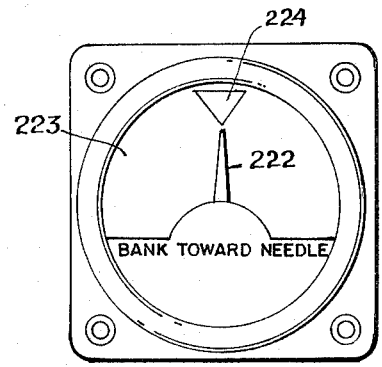
Figure 21:
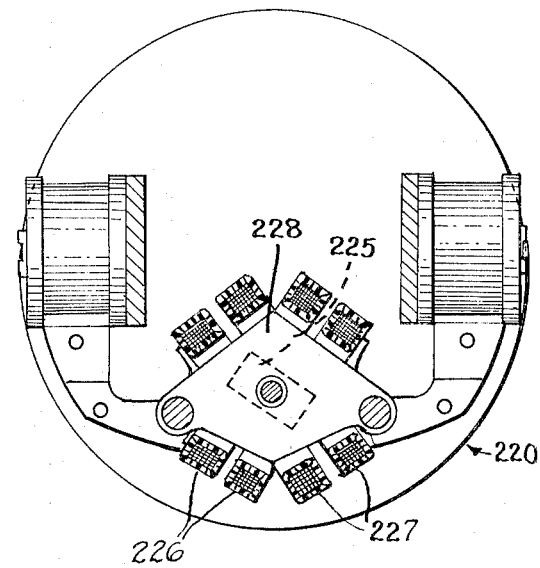
Figure 20:
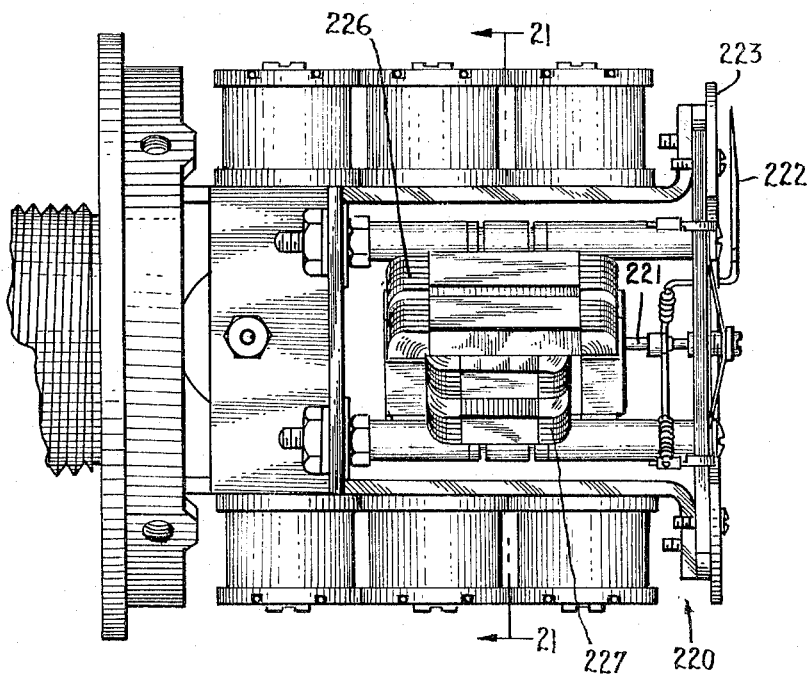

In the drawings:

FIGURE 1 is a front elevation of an instrument in accordance with the invention, FIGURE 2 is a section taken approximately along the indicated lines 2—2 of FIGURE 1, FIGURE 3 is a corresponding section through an instrument made in accordance with another embodiment of the invention adapted for universal use, FIGURE 4 is a front elevation of an accelerometer in accordance with the invention in which the force balancing means is a ball, FIGURE 5 is a front view of certain of the parts of the instrument shown in FIGURE 3, FIGURE 6 is a front view of an instrument representing a further embodiment of the invention including magnetic means for compensating for magnetic deviation sometimes encountered in some aircraft, FIGURE 6A is a section taken along the indicated lines 6A—6A of FIGURE 6, FIGURE 6B is a view illustrating a balanced magnetic unit incorporated in a pitch and distance measuring instrument, FIGURE 6C is a vertical section of a balanced magnetic unit provided with a heading selector in the form of an adjustable deflecting magnet, FIGURE 7 is a like view of another instrument in accordance with the invention combining an accelerometer and a balanced magnetic unit, FIGURE 8 is a section taken along the indicated lines 8—8 of FIGURE 9, FIGURE 9 is a section taken along the indicated lines 9—9 of FIGURE 7, FIGURE 10 is a front elevation of a multi-purpose instrument in accordance with the invention, the instrument including an accelerometer and a balanced magnetic unit, FIGURE 11 is a vertical section therethrough, FIGURE 12 is a schematic diagram of a magnetic guidance, auto-pilot system operating from a balanced magnet unit in accordance with the invention, FIGURE 13 is a like view of a simple, non-magnetic auto-pilot operated by an accelerometer in the form of a force balancing switch, FIGURE 14 is a partly schematic illustration of a further embodiment of the invention adapted for automatic and manual control with automatic warning circuits, FIGURE 15 is a section taken approximately along the indicated lines 15—15 of FIGURE 14, FIGURE 16 is a side elevation of a stable platform device controlled by magnetic units, FIGURE 16A is a fragmentary view of the liquid level switch taken at right angles to its showing in FIGURE 16, FIGURE 17 is a front elevational view of a magnetic beam follower in accordance with the invention, FIGURE 18 is a top plan view thereof, FIGURE 19 is a front view of another instrument in accordance with another embodiment of the invention, FIGURE 20 is a bottom view of the instrument shown in FIGURE 19 with the casing removed, FIGURE 21 is a section along the indicated lines 21—21 of FIGURE 20, FIGURE 22 is an elevational view of the dial for setting headings, and FIGURE 23 is a schematic view of the circuitry that may be used in the instrument of FIGURES 19, 20, and 21.

In the embodiment of the invention shown in FIGURES 1 and 2, a case 20 is provided with ears 21 apertured to receive attaching screws. A ring 22 retains the bezel 23 of the crystal 24 in frictional engagement with the resilient element 25 which is backed by the shoulder 26.

A first element, in the form of a card 27, is attached to the shoulder 26. The card 27 has indicia 28 arranged thereon to be read left or right with respect to a center marker and in relation to a marker 29 with which the crystal 24 is provided. The indicia 28 are adapted to be traversed by the needle 30 of the generally indicated second element 31. The second element 31 also includes a counterbalance 32 in the form of a magnet fixed on the needle pivot 33 supported by bearings 34 carried by the mount 35. The mount 35 also has spaced stops 36 engageable by the magnet 32 to limit the extent to which the needle 30 may swing.

The card 27 serves to support an accelerometer in the form of an approximately straight tube 37 having spaced markers 38 for reference in centering the bubble 39.

In the use of the instrument just described, it will be assumed that it is positioned in an aircraft with the axis of its pivot 33 disposed in parallel with the longitudinal axis thereof. When the aircraft is air borne and headed along the desired heading in straight and level flight, the bezel 23 is turned so that the marker 29 is alined with the needle 30 which will be on center or zero when the heading is Southerly or Northerly and the wings are level.

The instrument can be followed as a bank and heading indicator. If the craft is not known to be level, it can be used as a steady compass for any heading without Northerly turning error. It can be used for both, simultaneously, provided the heading is Southerly with the desired Southerly heading maintained by keeping the needle offset from its center position the desired amount but it is, in the embodiment just described, primarily a "survival" or orientation instrument. Should the pilot find himself in an unusual attitude, it would only be necessary to so move the aileron or rudder control or both as to bring the needle 30 and the "zero" marker into registry. The ship would then recover to fly straight and on a Southerly heading with its wings level.

The instrument integrates roll, bank, turn, and heading parameters into the movement of one needle. The "pitch" parameter is taken care of by other passive, non-gyroscopic means as will subsequently be described.

When, however, the orientation instrument is used in the above described manner, the aircraft is on the stable reference (Southern) heading of the instrument. Any displacement from that heading in bank, turn, roll, or heading will result in the needle 30 of the orientation instrument reading "off center" and correction consists of centering the needle in the usual manner. While the needle 30 can be centered, momentarily, on a Northerly heading, the aircraft will turn from this unstable heading to its stable Southerly heading.

The orientation instrument is essentially a South seeking device that is substantially immune to accelerations and can be used as a substitute for a gyro flux gate compass, directional gyro, gyro attitude and gyro turn indicators.

The instrument just described is adapted for use in the Northern Hemisphere and where a survival instrument in accordance with the invention is to be used in both hemispheres, it may be made in accordance with the embodiment shown in FIGURES 3 and 5 where a fixed circular card 40 is used so that it may be read in relation to the needle 41 of the generally indicated second element 42 whether its magnet 43 causes it to point upwardly or downwardly with reference thereto. The bezel ring 44 carries adjustable marks 45 which may be spaced apart as desired to show the operating limits of the instrument and the crystal 46 has a marker 47 for heading setting.

Where a non-magnetic control is wanted that will enable blind flight without gyros, the embodiment of the invention shown in FIGURE 4 may be used as part of instruments of the type described or as a separate instrument to be associated therewith.

In FIGURE 4, there is shown a case 48 having a card 49 rotatably retained by the ring 50 and provided with an arcuate rack 51 meshing with the pinion 52 whose shaft 53 is rotatably supported by the ring 50 and has a knob 54 by which the card 49 may be turned in either direction. The knob 54 has a marker 55 readable with reference to the scale 56 on the card 49.

The card 49 supports an accelerometer 57 in the form of a straight, transparent tube having spaced centering rings 58 for use in indicating the centering position of the ball 59 which is accurately dimensioned to roll smoothly from one end of the tube 57 to the other end thereof.

In the use of the instrument shown in FIGURE 4, the centering of the ball with the wings level, as indicated by reference to some other source or known scale calibrations, and at a given air speed, enables level flight to be maintained thereafter by re-centering the ball, provided that the rudder is left free and normal instrument cross checking to maintain correct air speed and heading is followed.

By use of appropriate coils with "dial in" heading controls, movable magnets, adjustable indice markers or other means, such as merely keeping the needle offset an appropriate amount, various headings may be flown. On headings from East to West through South, orientation instruments can be used as an effective substitute for all of the following blind flight instruments—Artificial Horizon (also called Attitude Indicator, Vertical Gyro and Attitude Gyro) with pitch to be maintained by my method, Gyro Flux Gate Compass, Earth Inductor Compass, Directional Gyro, Magnetic Compass and Turn and Bank Indicators (also called Turn and Slip Indicator). In addition to spatial and directional orientation; instrument let downs, climb outs, approaches and various maneuvers may be performed and headings flown by use of my orientation instrument (in place of the conventional gyro blind flight instruments listed above) while flying on headings in the range from East to West through South.

For flight in the range of headings from East to West through North, the spatial and directional orientation capability of the orientation instrument remains unaffected and it is still possible to roll out on a desired heading in a turn provided some other visual flight reference is used for maintaining aerodynamic control of the aircraft such as my "1–2" method of blind flight, using my accelerometer in place of gyro blind flight instruments (in the Northern Hemisphere).

Because orientation instruments use as their basic frame of reference the local direction of the lines of force of the earth's magnetic field and this direction varies with respect to the local direction of the lines of force of the earth's gravitational field it becomes necessary to properly coordinate the directional inputs from these two earth references. This is accomplished by maintaining the orientation instruments with due regard to the relative angles between the directions of the two force fields so that optimum orientation capability is achieved and the possibility of what I call a "premature reversal" is minimized and by using the proper method of controlling the aircraft. By "premature reversal," I mean a situation where the moving magnet unit attempts to reverse its direction before the aircraft is upside down with respect to the local gravitational lines of force.

For example, by having what amounts to a South seeking, vertically mounted, transversely swinging magnet in the Northern Hemisphere, it is not physically possible to depress the nose of an aircraft enough to cause the moving magnet to attempt to reverse itself in terms of the local gravitational field, while on a Southerly heading. If the elevator controls of this aircraft on a Southerly heading were pushed forward and held there, the aircraft would rotate in pitch through a vertical dive and begin to head North in an inverted dive flight attitude before the moving magnet would try to reverse itself.

When this delayed magnetic "reversal" took place the aircraft would be in an inverted dive on a Northerly heading hence the delayed magnetic reversal would be a desirable indication, as it came after a "gravity reversal" had taken place. In practice, by use of my method, the pilot should apply appropriate back pressure on the elevator controls to stop a dive by proper reference to any of a number of pitch indications that are available to him (as is common practice in blind flying), such as by reference to passive instruments that include the Airspeed Indicator, Sensitive Altimeter, Rate of Climb Indicator and even the "feel" of the controls or the longitudinal stability of the aircraft, as well as to center the needle of my orientation indicator by use of the aileron and/or rudder controls.

There are limitations to any apparatus, hence in certain relatively unlikely situations it may be necessary to observe certain precautions due to the changing relationship between the local direction of the lines of force of the earth's gravitational field (that the aircraft responds to) and the local direction of the lines of force of the earth's magnetic field that my instrument responds to, in equatorial and near equatorial latitudes and extreme "unusual attitudes." The local direction of the lines of force of the two force fields coincide at the magnetic poles, but they gradually change direction relative to each other until they are at a 90 degree angle to each other at the magnetic equator. The most noticeable effect of this "directional divergence" of the two force fields is that the maximum angle of bank on an East or West heading with the needle of a vertically mounted instrument centered in level flight, will change from zero (no bank at all) at the magnetic poles to 90 degrees at the magnetic equator (with respect to the local gravity vertical).

In the latitudes generally involved in flying over the Continental United States, Canada and Alaska only moderate angles of bank are generated in an "Orientation Cycle" with a vertically mounted instrument. As equatorial and near equatorial latitudes are encountered, or as flight is continued from the Northern Hemisphere into the Southern Hemisphere the "directional divergence" of the two force fields with respect to each other changes to a 90 degree directional divergence at the equator with the effect of the earth's magnetic field going through a 180 degree polar phase shift with respect to a vertically mounted instrument in level flight when crossing from the Northern Hemisphere to the Southern Hemisphere. (This causes the needle of the orientation instrument to attempt to reverse its indication.) In a "universal" instrument, the needle is permitted to reverse itself, but in an instrument built for use in one hemisphere, the needle will move to the limit of its travel and then remain against its limit stop unless the instrument is inverted or unless the instrument is rotated in a fore-and-aft direction so that the dial is uppermost. The amount of such rotation, for optimum results, would be directly related to the magnetic latitude and might be 90 degrees at the magnetic equator or in the hemisphere opposite to that the instrument was designed to operate in. In near equatorial latitudes in the hemisphere in which the instrument was designed to operate, the fore-and-aft, face up, tilt mounting of the instrument might be approximately 45 degrees for optimum results. By suitable adjusting the angle of longitudinal tilt of the instrument a pilot could, in effect, change the operating characteristics of the instrument to suit himself since by so doing he would be changing the orientation cycle angle of bank and the angular aircraft pitch limits before needle "reversal" occurs (with respect to straight and level flight). In general the orientation cycle angle of bank might be kept as small as practical and the angles of aircraft pitch at which needle reversal occurs might be as far removed from the local gravity horizontal as practical, while favoring an increased "dive" to "climb" angle limit. This is because my method provides for ignoring "climb" reversals but uses all "dive" indications.

My invention takes into consideration the fact that premature needle reversal may occur under certain relatively unlikely circumstances, hence to prevent possible undesirable consequences, the proper method of integrating the indications of the orientation instrument with the characteristics of the aircraft and certain other non-gyroscopic instruments is provided, to minimize the possible effect of such an occurrence. I assume a pilot in an overcast is primarily interested in recovering from a "graveyard spiral dive" or any "out of control" dive (such as occurs in a roller coaster type of out of control situation), since any other "out of control" situation in an overcast will normally turn into a nose low, high speed dive. Thus the possible effect of a "premature needle reversal" caused by an extremely nose high attitude can be negated by first looking at other non-gyroscopic instruments, such as the Airspeed, Sensitive Altimeter, and/or Vertical Speed Indicators to determine if the aircraft is in a climb that might exceed the local angle of the lines of force of the earth's magnetic field, plus the amount of fore-and-aft instrument tilt, or simply determining whether the aircraft is climbing or descending, by conventional use of the above mentioned instruments. As long as the aircraft is descending in a *nose low* attitude, centering the needle of the orientation instrument should result in a reasonably safe "orientation cycle" recovery, provided suitable back pressure is applied to the elevator control to reduce excessive airspeed and vice versa as is well known in the blind flying art. In the Continental United States, Canada and Alaska, however, the situation does not get as complicated as it does at equatorial or near equatorial latitudes, also conventional magnetic compasses lose their "Northerly Turning Error" at the equator and hence become available for use as "blind flying instruments" at the magnetic equator. At the latitude of Boston, Massachusetts, for example, an aircraft would have to be in a near vertical, approximately 73 degree, nose high "climb" angle, on a Southerly heading to have a "premature needle reversal" in "climb."

Similarly the pilot would have to be in a near vertical, approximately 73 degree dive on a Northerly heading to have a "premature needle reversal" occur in a "dive." Even in the remote contingency that such a "premature needle reversal" did occur with what is essentially a South seeking device while on a Northerly heading, the aircraft would, by use of my method of centering the needle with ailerons and/or rudder and maintaining desired airspeed with the elevators by watching the Airspeed Indicator, still achieve straight and wings level flight on a Southerly heading from this "very unusual attitude." I have found it is advisable to begin to apply back pressure on the elevator control at once if in a normal dive. If the needle has gone through a "premature reversal" relative to the local gravity vertical, such action if taken promptly would bring back the needle and the Orientation Cycle would proceed in normal fashion by keeping the needle centered.

If, for some reason, forward pressure on the elevator control was held long enough while in a Northerly heading to cause a "premature needle reversal" in a dive, but not long enough to actually invert the aircraft, the aircraft would still recover by use of my method of starting recovery by applying back pressure on the elevator control and then centering the needle with ailerons and/or rudder controls. A normal Orientation Cycle would then take place. If, for some reason, on a Northerly heading, the nose of the aircraft was depressed past the vertical so that magnetic field needle reversal and gravity field reversal both took place before corrective action was taken my method would still result in effective recovery, preferably first centering the needle of the orientation instrument with the ailerons and/or rudder first and then applying back pressure to the elevator controls to reduce airspeed for minimum altitude loss. The aircraft would first roll upright from its inverted attitude and then recover to straight and wings level flight on a Southerly heading by pulling out of its dive without going through the usual Orientation Cycle.

If the pilot was unable to distinguish passing through both the magnetic and gravitation field reversals, he could either apply back elevator to reduce excessive airspeed and center the needle with ailerons and/or rudder as nearly simultaneously as possible or apply back elevator first. He should still recover provided he had sufficient altitude and did not overstress the aircraft. I prefer, as a second choice, simultaneous application of back elevator and centering needle of orientation instrument in such a situation. It is not possible to have a premature magnetic needle reversal in a "nose up" attitude on a Northerly heading in the Northern Hemisphere for the same reason it is not possible to have a premature magnetic needle reversal in a "nose down" attitude on a Southerly heading due to the slant angle of the lines of force of the earth's magnetic field, which incline downwardly from the equator to the poles. In the relatively unlikely situation where a pilot did not recognize a "premature magnetic reversal" in "climb" attitude, use of my basic method should still enable recovery. Although it is preferred that premature needle reversals in "climb" attitudes be ignored, the centering of the needle of the orientation instrument with ailerons and/or rudder and applying back elevator pressure to reduce excessive airspeed (or vice versa) should still give the pilot a reasonable chance of safe recovery. In all probability he would have gotten into such a dangerous attitude by excessive back pressure on the elevator control; a rapid check of his Airspeed, Altimeter, Vertical Speed or other suitable means should tell him that he is in a steep nose high "climb" attitude with the airspeed probably dangerously low. This would call for first applying forward elevator pressure to increase insufficient airspeed and then centering the needle of the orientation instrument with ailerons and/or rudder for orientation in roll, bank, turn and heading. The aircraft should then nose down through the critical needle reversal angle of the earth's magnetic field to normal straight and wings level flight on the Southerly heading without going through an Orientation Cycle.

Suitable back elevator pressure on an aircraft in a nearly vertical climb attitude while on a Southerly heading with the aircraft having excessive airspeed, should result in a gravity reversal, that is the aircraft would complete half of an inside loop; then centering the needle of the orientation instrument (that had already gone through a premature reversal) would result in a half roll to right side up flight on a Northerly heading and keeping the needle centered should then result in a normal Orientation Cycle recovery to the usual straight and wings level flight on a Southerly heading.

Another possibility is aircraft wing stall. This would result in a nose down attitude from which a routine orientation cycle recovery would be made by the usual method, and still another possibility is the aircraft falling off into a "spin." This involves a nose low attitude with insufficient airspeed, as one wing remains stalled in a spin. In addition a "spin" can frequently be identified as such by the way the needle moves back and forth as the aircraft autorotates. Spin recovery is essentially the same as for a spiral dive except that a spiral dive has excessive airspeed, calling for immediate back pressure on the elevator control to reduce excessive airspeed while a spin has insufficient airspeed calling for forward pressure on the elevator control to increase airspeed. In a spin, the needle of the orientation instrument should move back and forth but remain generally on one side of the dial more than the other. The side of the dial the needle favors indicates to the pilot the direction of the spin. Thus in my preferred "bank towards needle" sensing of these instruments, in a right spin, the needle would tend to favor the left side of the dial. Pushing the elevator controls forward to increase insufficient airspeed and applying opposite aileron and/or rudder to the direction of the spin as called for by the needle of the instrument should result in effective "spin" recovery in most civil aircraft.

Referring now to an accelerometer in accordance with the invention such as the above disclosed, the existing "state of the art" teaches that a curved ball bank indicator should be centered in a properly banked turn and pilots have accepted this technique. As part of my invention, I have found that a straight tube type of accelerometer as disclosed should not be centered in a properly banked turn, assuming it was centered in level flight, provided the air speed is kept the same and the feet are kept off the rudder pedals in single engine aircraft. This is because a straight tube has an entirely different and unexpected effect than the conventional curved one, as the curved tube responds to acceleration components about the pitch axis while the straight tube does not. Thus, the straight tube becomes a device for discriminating between acceleration components. This ability permits a straight tube to be used as an aircraft equilibrium balancing device by sensing the change in certain accelerations, such as motion about the yaw and roll axes, and discriminating against sensing the change in other accelerations, such as up or down centrifugal and fore-and-aft accelerations with respect to the aircraft. The main reason human beings cannot fly blind without flight instruments is that humans cannot distinguish between accelerations caused by gravity and other accelerations such as are caused by "centrifugal force" such as developed in a turn. The term "straight" is intended to include tubes that are approximately straight provided their curvature is sufficiently slight so as not to introduce excessive sensitivity about the pitch axis and not to reduce the sensitivity to accelerations about the roll and yaw axes.

I have found that by discriminating against some of the complicated and numerous acceleration components acting on an aircraft in flight and by balancing others of them against each other, and by other means, I am able to use the straight tube as described as an acceleration balance indicator to tell when something affects the acceleration equilibrium balance being monitored. This straight tube acceleration balance indicator, in order to enable blind flight to be achieved, must work in cooperative combination with the characteristics of the aircraft and proper pilot tehniques quite different from state of the art teachings and with quite unexpected and unobvious results.

It is well known that aircraft can be flown without the pilot touching the rudder pedals, by using the ailerons to bank and turn as well, since an aircraft will turn if banked, without touching the rudder controls. As part of this invention, I have found that when an aircraft is flown without use of the rudder pedals the aircraft itself then becomes an acceleration component discriminating and sensing device in that acceleration components, such as occur in turns according to the speed, are reflected in the aircraft yaw angle in normal "instrument" flight, where severe "unusual attitudes" are to be avoided and only relatively shallow banks, turns, climbs and descents are used, except in emergency situations.

The basic problem in controlled "instrument" flight is "which way is up" because gravity acceleration and other acceleration components, such as "centrifugal force," become intermingled, and the vector sum of these acceleration components act on and confuse the pilot's "inner ear," thus upsetting his equilibrium.

Gyroscopic instrumentation has been the only practical way to tell the pilot "which way is up" for the last fifty years of flight, although many have tried unsuccessfully to solve the problem.

In order to understand the basic principles as to why a ball, or bubble, in an approximately straight tube makes it possible to fly behind without gyros, it is desirable to first understand the nature of the problem of blind flight and why it remained unsolved for many decades, except for gyroscopic instrumentation.

The essence of the problem is that to fly blind in spirally unstable aircraft, such as are being flown at the present, it is necessary to somehow circumvent the scientific "principle of equivalence" in physics which states that since accelerations caused by gravity cannot be distinguished from other accelerations by measurement they must be equivalent to each other. In practice this means that where gravity cannot be distinguished from "centrifugal" force by the pilot, the vehicle or the instrumentation, it becomes quite impossible to fly blind for any substantial length of time without loss of orientation and hence control.

The usual ending to such a situation is the aircraft ending up in a high speed "spiral dive" and plunging to earth in a near vertical attitude with the best efforts of the pilot to extricate himself from his predicament only making matters worse due to his lack of spatial orientation or knowledge of "which way is up" and the lack of spiral stability of the aircraft. This is caused by the inability of either the pilot or the aircraft to separate, circumvent or otherwise distinguish between gravity acceleration and other accelerations acting on the aircraft such as centripetal accelerations that produce the effect called "centrifugal" force.

It should be understood that so called "stable aircraft" are seldom if ever "spirally" stable which, coupled with the complex interaction of human pilot reaction, aircraft dynamics and the principle of equivalence, created an extremely difficult problem to solve.

The only accepted practical solution up to the present has been use of gyroscopic instruments and devices that require power for their operation, are not self-contained, are relatively expensive, complicated, heavy and unreliable.

It is the object of my invention to create an entirely new art, that of "blind flight without gyros or power operated instruments or devices," where means and methods can be made available of sufficient simplicity, reliability, light weight, low cost, etc. so that all who fly could take advantage of it either as a "back up system" in case of gyro malfunction, or a primary system of blind flight.

A ball in a curved transparent tube (Ball Bank Indicator) has been used to balance against each other the components of (a) the "centrifugal" force (effect of centripetal acceleration) during a turn at constant speed and (b) the acceleration of gravity, for approximately as long as there have been flyable aircraft. It is accepted "state of the art" teaching and is well covered by United States Department of the Air Force Manual #51–38 May 1956 (Revised) entitled, "Theory of Instrument Flying," on pages 49 and 50 and U.S. Air Force Manual 51–37 (15 November 1960) entitled "Instrument Flying" on pages 3–15 and 3–16. The use of this instrument is summed up in the last paragraph on page 50 of U.S. Air Force Manual #51–38 (May 1956 revised) entitled, "Theory of Instrument Flying," as follows:

"The ball instrument is used to check the pilot's coordination. It is actually a 'balance' indicator, because it indicates the relationship between the angle of bank and the rate of turn. It tells the pilot the 'quality' of the turn; whether the aircraft has correct angle of bank for its rate of turn."

There is nothing in these manuals to suggest that a ball in a tube instrument could be used in place of a gyroscopic "Turn" indicator or gyroscopic "Attitude" indicator to circumvent the "principle of equivalence" and hence make it possible to fly blind by its use in place of gyroscopic instrumentation. On the contrary it is universally taught that this is quite impossible, as indeed it is, utilizing "state of the art" methods, apparatus and concepts.

Since actual flight tests prove conclusively that it is readily possible to fly blind using a ball or bubble in an approximately straight tube apparatus without requiring gyroscopic instrumentation, provided my method is also used, it then becomes evident that some other explanation must be involved than that given for the conventional "ball bank" indicator to thus enable the "principle of equivalence" to be circumvented.

I believe that the correct explanation of the effectiveness of my accelerometer is essentially as follows:

It is not enough to balance "centrifugal" force against gravity. To circumvent the "principle of equivalence" with "Attitude" indicators (also called Artificial Horizon Indicators) a gyroscope with its spin axis vertical and having several degrees of freedom is "slaved to the earth's gravitational field" by means of pendulous or other erecting mechanisms that, in effect, convert the gyroscope into a damped pendulum with a long time constant. The pilot of an aircraft is supposed to recover from an "unusual attitude" sufficiently quickly relative to the long time constant of the erecting structure slaved to "gravity" that the acceleration errors will not be intolerable. The same situation prevails in level flight and normal turns, glides, climbs, speed changes, etc.

In actual practice due to the principle of equivalence, it is not possible to slave the erecting mechanism to gravity alone, but instead it is slaved to the vector sum of all the forces acting on the erecting mechanism. This means that in a turn or speed change, the accelerations acting on the erecting mechanism cause acceleration errors that deleteriously affect the indications of the instrument by precessing the gyroscope out of its normal indication. Fortunately, in the past, it has been possible to keep acceleration errors to reasonable amounts, thus permitting a usable instrument (as the errors gradually cancel out when the aircraft resumes straight and level flight and the extraneous accelerations disappear). As aircraft speeds increase acceleration errors become more serious, however.

It can be seen that the "principle of equivalence" was circumvented in this case by creating a long time constant, gyro erecting device and using the instruments on aircraft where prolonged accelerations are not encountered (other than gravity acceleration). "Attitude" indicators are completely vulnerable to prolonged accelerations and do not work well upside down for this reason. Most civilian "Attitude" indicator gyros hit limit stops, "tumble," and become useless for recovery from extreme "unusual attitudes."

The "principle of equivalence" is also circumvented by use of the gyroscopic "Turn and Bank" (sometimes called Turn and Slip) indicator in another way. Here a gyroscope with one degree of freedom is mounted with its spin axis horizontal in such a manner as to precess when the aircraft yaws or turns about its yaw axis. A "Turn" needle indicates the direction and amount of precession which is used to indicate the rate of turn or yaw. This instrument cannot "tumble" or "precess out of indication" as "Attitude" indicators do but is ambiguous in that it can read the same upside down as right side up, hence does not in itself tell "which way is up." It does monitor accelerations about the yaw axis of the aircraft, hence is called a "Turn" indicator. It discriminates against accelerations in the roll axis and pitch axes of the aircraft. By monitoring accelerations about only one axis of the aircraft it makes possible blind flight when used with the proper method, by reason of its ability to circumvent the "principle of equivalence" by selecting yaw axis accelerations to monitor.

The proper method is called the "1–2–3 needle, ball and airspeed, partial panel (or primary) system of blind flight." It depends upon the dynamic characteristics of aircraft and proper use of certain instruments, the most essential being the needle of the "turn" indicator, a ball in a curved glass tube ("Ball Bank" or "Slip" indicator) that is made a part of the Turn indicator and the Airspeed indicator, hence the name of the system.

This system has remained virtually unchanged since its introduction a number of decades ago and still is the only accepted "emergency" system of blind flight. It has many drawbacks for present day aircraft, including requiring a vertical dive as part of the recovery procedure from an inverted attitude. "Completing the loop" as a means of recovery from an inverted attitude under instrument conditions is likely to consume so much altitude or place so much stress on modern aircraft that destruction of the aircraft and its occupants is quite likely to occur. Yet the above is the standard "partial panel" recovery procedure. Centering the turn needle with the rudder will stop the aircraft from turning. Being able to monitor the accelerations about the yaw axis of the aircraft separately is the key to being able to circumvent the "principle of equivalence" here, since it enables a turn to be stopped, regardless of other accelerations such as gravity. Once the turn has been stopped (assuming the aircraft is right side up) it then becomes possible to center the ball in the curved tube with the ailerons, thus monitoring the accelerations about the roll axis (when this is accomplished the aircraft is headed straight ahead with its wings level). The third step is to monitor the accelerations about the pitch axis by use of the airspeed indicator, reducing airspeed by applying back pressure to the elevator control and increasing airspeed by forward pressure. If upside down, a special technique is called for that is seldom taught or described in manuals with the result that probably most pilots would be unable to recover from inverted flight by this system.

This is the essence of the "1–2–3 needle, ball, airspeed system of blind flight." Other instruments such as altimeter, rate of climb, magnetic compass, and clock are used in practice, and timed turns to various headings can be made by off-setting the needle of the Turn indicator one or two needle widths for the appropriate length of time in seconds, based on the turning rate the Turn indicator is set for, to complete the turn to the desired heading.

It is therefore possible to circumvent the "principle of equivalence" once apparatus and means of monitoring accelerations or forces about the yaw axis are available.

Thus a basic requirement for flying blind might be considered to be the ability to monitor the accelerations or forces about at least one axis of the aircraft separately. In practice the "1–2–3 needle, ball, airspeed" system is proof that if the accelerations or forces about the yaw axis can be separated from the other accelerations or forces for monitoring purposes that a practical system can be evolved for blind flight even though the monitoring means for the other accelerations or forces may not be as selective as the one for the yaw axis, hence might be dependent upon the proper method as well as apparatus to achieve proper selectivity.

Suppose the Turn indicator is eliminated entirely and the curved tube with a ball in it is straightened out but kept in the same location as before. The ball in this straight tube will no longer respond to gravity acceleration the way it would when the tube was curved, nor will it respond to the vector sum of the "centrifugal" and gravitational forces in a turn the way it would before but tends to completely discriminate against all forces or accelerations at right angles to the path of the ball. This means that if the tube is parallel to the earth, the effect of gravity upon the lateral position of the ball in the tube has been completely nullified, without affecting the ability of the ball to sense accelerations about the yaw axis of the aircraft.

Now suppose the aircraft were flown in a perfectly coordinated manner where no sideslipping or skidding took place. According to accepted teachings this would keep the ball in a curved tube ("Bank" indicator) centered because the gravitational force and the "centrifugal" force, if any, would balance each other out, so regardless of whether the aircraft were flown level or in a coordinated turn, the ball in the curved tube would remain centered at all times.

The "principle of equivalence" says that gravity and "centrifugal" forces are equivalent to each other, so having shown that the ball position in a straight, level tube was not affected by gravitational forces in level flight, it now follows that it is not affected by combined centrifugal and gravitational forces provided they are balanced out in a coordinated turn.

Having cancelled out the effect of centrifugal force and gravity by balancing them out against each other, as is normal in coordinated flight, this leaves the ball in the straight tube free to act as a sensing device for other forces or accelerations, provided proper coordinated flight can be maintained by other means.

The "1–2–3 needle, ball, airspeed" system shows the desirability of monitoring the forces or accelerations about the yaw axis of the aircraft.

Assume that gravity and centrifugal force have cancelled each other out, then any accelerations about the yaw axis of the aircraft would immediately be sensed by the ball in the straight tube of the eccelerometer (due to its lateral position). Thus the ball in the straight tube could be used to monitor the vector sum of the accelerations acting about the yaw axis. It follows that if this is so, then the ball in the straight tube could be used as a turn indicator, provided any change in the accelerations acting about the yaw axis of the aircraft could be related to a turn. It is well known that changing virtually any of the accelerations acting on an aircraft may react about the yaw axis, thus all of these parameters should be held as nearly constant as practical. If this is done by maintaining constant airspeed, power, propeller pitch, flap settings and the like, then any change in the forces or accelerations acting about the yaw axis of the aircraft should be due to the aircraft turning.

If the ball of the straight tube of the accelerometer is centered when the aircraft is flying straight and level in balanced equilibrium as described, then a turn is indicated by the ball rolling to one side of center. A left turn is indicated by the ball rolling to the left and a right turn by the ball rolling to the right. This assumes that a proper coordinated turn is made to cancel out the effect of gravity and "centrifugal" force on the ball.

If the airspeed is increased by nosing the aircraft down or applying more power, then the resulting change in the forces and accelerations acting about the yaw axis of the aircraft will cause the ball to roll to one side or the other depending on whether the airspeed is increased or decreased. If the ball is centered by rolling the aircraft in the direction of the ball's movement, then the aircraft will stabilize in a predictable turn which can be maintained as long as desired. Level flight can be achieved again merely by reverting to the original airspeed, while keeping the ball centered.

The instrument can be calibrated so that with the aircraft in balanced equilibrium with respect to the forces or accelerations acting about yaw axis of the aircraft, the amount of tilt of the straight tube can be read directly in terms of angle of bank at a given airspeed, or rate of turn at a given airspeed.

Thus blind flight without gyros can be achieved simply by setting the straight tube of the accelerometer to the proper tilt angle for the desired airspeed, centering the ball for level flight and maintaining the selected airspeed. For turns, the airspeed can be varied to produce the desired rate of turn, or the tilt angle of the straight tube adjusted to give the desired rate of turn (with the ball centered).

The above assumes one important factor—that the aircraft is flown in a perfectly coordinated attitude at all times so that the effect of gravity and centrifugal force on the ball in the straight tube will be balanced out, leaving the ball free to respond to the vector sum of the accelerations or forces about the yaw axis.

The proper method must be used to accomplish this. Modern aircraft are so designed that the rudder control is largely superfluous except for landings and take offs. Most modern aircraft, when properly trimmed, will do a better job of consistent coordination in straight flying or shallow turns, such as are used in instrument flight, than the human pilot.

Thus, to insure proper, consistent, repeatable coordination, it is only necessary to refrain from touching the rudder controls and control the aircraft in instrument flight entirely by the ailerons and elevator controls.

This gives rise to my "1–2 ball, airspeed" simplified system of blind flight without gyros that eliminates the gyro Turn indicator and involves monitoring only two basic instruments to maintain control of the aircraft. My method is as follows:

(1) Center the ball or bubble of the accelerometer with ailerons.

(2) Control airspeed with the elevators.

Note: Keep feet off the rudder pedals. Adjust tilt of straight tube of the accelerometer to desired attitude of aircraft at selected airspeed. If fixed tube; adjust airspeed of aircraft to give desired attitude. Change attitude of aircraft by changing airspeed to produce the desired attitude, with fixed tube.

The method uses as its frame of reference the aircraft itself, as its own inertial frame of reference for controlling motion in roll, bank, turn and yaw, and its own aerodynamic frame of reference for controlling motion about its longitudinal flight path. While it is relatively immaterial which force fields the parameters of roll, bank, turn and yaw are controlled by, in terms of actual flight, it is desirable that the longitudinal flight path of an object, such as an aircraft, flying in the earth's atmosphere be slaved to the medium in which it travels for optimum safety and convenience. I prefer to use the parameter the aircraft itself is primarily concerned with, which is the angle of attack of the relative wind flowing over the wings with respect to the forward motion of the aircraft. By maintaining the proper angle of attack with respect to the relative wind, as called for by the aerodynamics of flight, by use of an angle of attack indicator, or, as a universally available expedient, an airspeed indicator, or other means of sensing changes in the angle of attack, such as an "instantaneous vertical speed" indicator, I achieve the desirable objective of controlling the longitudinal flight path or trajectory of the vehicle by reference to the environment in which it is traveling.

In practice the atmosphere may be moving with respect to the earth and since the aircraft is able to stay airborne primarily by the aerodynamic effect of the air of the atmosphere upon the airfoils of the aircraft it introduces an element of safety to use as a longitudinal flight path frame of reference, the desired aerodynamic relationship between the aircraft's motion and air flowing over its wings. This is essentially what an "angle of attack" indicator measures and to a somewhat lesser degree, the Airspeed Indicator or Instantaneous Vertical Speed Indicator provided "g" forces are restricted to maintaining the desired airspeed (or vertical speed and altitude). Thus my "1–2" method and apparatus for blind flight uses in combination, the motion of the aircraft in inertial space as its frame of reference for its roll, bank, turn and yaw parameters and the motion of the aircraft through its atmospheric environment as its frame of reference for its longitudinal flight path parameter, without the use of gyros or other power operated devices.

Reasonable proof that the above theoretical explanation is the correct one may be deduced from the fact the system only works if the feet are left off the rudder controls. The rudder is the primary control for movement of the aircraft about its yaw axis and becomes part of the balanced equilibrium the aircraft assumes about its yaw axis as long as the rudder is left alone. If the rudder is moved by the pilot this balanced equilibrium is cancelled. Many aircraft will fly with proper coordination by use of the rudder instead of the ailerons. My "1–2 ball, airspeed" method nevertheless does not appear to work on such aircraft unless the rudder control is left free instead of the ailerons. This is convincing proof that after balancing out gravity against "centrifugal" force by means of a straight tube and naturally coordinated flight, that ball movement is due to natural forces or accelerations about the yaw axis of the aircraft, sensed by sideways movement of the ball, within the limitations of the system.

Another proof is that the ball can readily be kept centered or moved to any part of the straight tube and held there by appropriate movement of the ailerons and/or elevators, showing that the natural forces controlling the ball produce an effect quite different from that of gravity or "centrifugal" force on the ball. The control effort to keep the ball centered is easy and natural and there is no tendency for it to roll aimlessly one way or the other in properly coordinated flight as might be expected if gravity and "centrifugal" force were the controlling factors.

Like other means of circumventing the "principle of equivalence" there are limiting factors. In the case of "Attitude" indicators with vertical gyros, prolonged accelerations render the instrument useless unless means is provided to render inoperative the erecting structure during such accelerations. But if this is done the gyro will gradually precess out of indication as a result of bearing friction and other reasons. Nearly all "Attitude" indicators have limit stops beyond which they become inoperative and useless for recovery from an unusual attitude."

With the gyro Turn indicator and the "1–2–3 needle, ball, airspeed" system the Turn gyro needle is ambiguous and does not tell the pilot "which way is up," since both the needle and ball can readily be centered upside down. Actually in a loop, for example, both needle and ball are normally centered at the top of the loop when the aircraft is inverted. As a result of pilot confusion about how to recover from inverted flight in an overcast, and the shortcomings of gyro instruments and blind flight methods, most pilots who inadvertently become involved in such a situation at the present "state of the art" would probably crash.

In the case of my "1–2 ball, airspeed" system there are limits beyond which the system becomes inoperative. Fortunately it is accepted "state of the art" practice to make shallow turns in flying blind. As long as this rule is adhered to the system should work satisfactorily. Unlike gyro "Attitude" indicators there are no limit "stops" with the instrument suddenly going berserk and perhaps damaging itself, but the "effect" gradually stops being effective as the bank is increased beyond that required for normal instrument flying. If this should occur inadvertently it is only necessary to refer to my orientation instrument to regain orientation and control, even from an inverted or other extreme unusual attitude, by centering the needle of the orientation instrument, and conrolling airspeed with the elevators (if required). Recovery from inverted flight will be by "rolling out" instead of "completing the loop."

My "1–2 ball, airspeed" system enables normal blind flight on any heading and permits turning to any heading as desired.

My orientation instrument and orientation method permit recovery from any reasonable attitude without excessive loss of altitude or "g" loadings and blind flight on equatorial headings.

Used with my "1–2 ball, airspeed" method of blind flight, a substitute for a Directional Gyro or Gyro Fluxgate Compass is provided since the pilot is enabled to roll out on the desired heading without having to cope with "Northerly Turning error" that renders conventional magnetic compasses unreliable during a turn.

Thus the two methods act in cooperative combination with the aircraft and each other in such a way that "blind flight without gyros" becomes possible without external reference to the horizon or to gyro instruments. This is an entirely new art and is based on circumventing the "principle of equivalence" twice, once by non-Newtonian magnetic field means and once by an "effect" that obeys Newton's laws of motion.

I have found as part of this invention that an accelerometer comprising an approximately straight tube with a ball or bubble in it as described herein makes a simple, sensitive, rugged, and inexpensive accelerometer having the desired characteristics when properly mounted. The preferred embodiment of this part of my invention has the approximately straight tube mounted transversely in the aircraft and so arranged that it can be tilted laterally, by the pilot, to the left or the right of level; although it is possible to maintain control and do some maneuvering with just an approximately straight fixed tube properly mounted as taught herein.

To maintain straight and level flight by use of my invention, the pilot need only keep the ball or bubble of the accelerometer away from the ends of its tube by use of the ailerons, moving the aileron control opposite to the direction the ball is offset from the desired position, (or vice versa for the bubble), after first setting the straight tube to the proper lateral tilt angle to keep the ball away from the tube ends in level flight at the desired air speed (see step No. 6 for details). This assumes that a free rudder and proper air speed are maintained, as previously taught, as do the steps following.

Blind flight in accordance with the invention requires the pilot only to continuously monitor two instruments, so it could be called the 1, 2, or ball and air speed system, and uses only two controls, the ailerons for controlling the ball and the elevators for controlling the air speed. In addition to being simpler, it is lighter, more rugged, more reliable, less expensive and requires no power operated gyro instrument, with the possibility of malfunction due to power failure, bearing failure and the like.

The next step in my 1, 2 primary system of blind flight is how to make controlled turns. My system gives the pilot several choices as follows:

For normal straight and level flight, the air speed, in stabilized cruising flight, may be selected and maintained by use of the elevators and air speed indicator. Then, while the aircraft is leveled by other means, such as the orientation instrument, the straight tube of the accelerometer is adjusted by tilting it so as to center the ball or bubble and thus indicate balanced accelerations about the aircraft yaw axis. The instrument may be precalibrated so the proper tilt angle for a given air speed and bank can be readily determined in flight and the tube tilted to that angle without requiring external leveling means or gyro devices.

In order to slave the longitudinal flight path of the aircraft to the curvature of the earth, instead of inertial space, I have found it desirable to detect deviations from the desired longitudinal aerodynamic flight path by use of an instrument such as an Airspeed Indicator. The Airspeed Indicator becomes an integral part of my "1–2" method of blind flight, as it not only detects changes in the longitudinal component of acceleration of the aircraft, correctable in the usual manner familiar to all pilots, (i.e. to correct for excessive airspeed apply appropriate back pressure to the elevator control and vice versa), but also reflects changes in the aerodynamic angle of attack with respect to the relative wind, provided the "$g$" loading is held to a uniform value, of approximately one "$g$."

In order to turn at a desired rate, it is only necessary to tilt the tube the proper amount and maintain the same air speed with the elevators and keep the ball away from the tube ends with the ailerons. For precision turns, the ball should be centered.

The rate of turn can be determined by the air speed and the amount of tube tilt. With experience a pilot would quickly learn the approximate amounts necessary although a Speed-Turn-Tilt card could be made up if desired, for him to enter with desired speed and turn values and obtain the amount of left or right tilt by which to set the tube, or the instrument itself could be calibrated to present this information.

Since an entirely new art, that of "blind flight without gyros" is involved, it is not practical to enumerate all the techniques and refinements possible; however, an alternate method of turning, which does not involve changing the tilt of the tube of the accelerometer may be of value to the pilot and makes possible the use of an approximately straight tube device properly secured to the aircraft laterally so the ball (or bubble) is centered in level flight at a desired speed.

My method of turning with such a fixed tube or without changing the tilt of an adjustable tube is to vary the air speed instead of the tilt of the tube. This changes the value of the acceleration components acting about the yaw axis of the aircraft and upsets the acceleration equilibrium balance monitored by the fixed tube so that the result is that when the ball (or bubble) is centered in the tube by the usual means of aileron control, the aircraft will stabilize in a predictable turn at the new air speed. The amount of the bank will be determined by the amount of the air speed change and the direction of the turn will be determined by whether the air speed has been increased or decrased as set forth above.

Thus, to change the heading, it is only necessary to raise of lower the nose of the aircraft slightly with the elevators to slow down or increase the air speed until the desired heading is reached and then return to the original air speed to achieve straight and level flight again, keeping the ball centered with the ailerons for precise turns and away from the tube ends in any case.

My method for making small changes in heading without changing air speed or tilt of the tube is simply to momentarily push or tap the rudder pedal in the direction of the desired change of heading as often as required. Such momentary use of the rudder would effect a few degree change of heading for each tap but would not interfere with maintaining control of the aircraft provided the ball was kept away from the ends of the tube and the feet off the rudder pedals between taps. The sudden ball movement during the brief tap should be ignored.

My method for precise flying by my 1, 2 (ball, air speed) primary system is to keep the ball of the accelerometer centered for normal flight. This can be done since the straight tube is not acting as a level but as an acceleration sensing device. In level flight, with the ball centered, a very small heading change can be made by moving the ball to one side of the center but still away from the tube end by normal use of the ailerons. The result is that such movement of the ball, by use of the ailerons, will cause a change in heading and show the pilot which direction and approximately how much, based on previous experience.

Now, if the pilot wants to recenter the ball without significantly changing the new heading that was arrived at by offsetting the ball with the ailerons, he can do this by light quick taps of the rudder as required to recenter the ball (usually only one is required). Thus, the pilot can end up on the proper heading with the ball centered and kept centered as a routine method despite the straight tube, as the accelerations about the yaw axis sensed by the ball can effectively keep the ball in any section of the straight tube desired, including the center, in contra-distinction to a ball in a transverse straight tube being controlled by gravity, which ball could hardly be centered as a routine operation.

If for any reason, a pilot went "out of control" using my 1,2 (ball and air speed) system he could revert to the orientation instrument to regain his orientation as it is not affected by the intermingled accelerations with rapidly changing values that make "out of control" recovery so difficult using Newtonian devices, as a practical matter.

While the above explanation describes instruments and "state of the art" concepts concerning powered aircraft, the use of my invention is not limited to vehicles of this type but encompasses other vehicles that might travel under the atmosphere, such as submarines and torpedoes or over the atmosphere, such as earth satellites, missiles and space ships, or on the surface, such as ships at sea.

The earth satellite in free flight at the present "state of the art" presents a difficult attitude or orientation control problem inasmuch as the usual orientation reference systems do not work well in earth satellites or space vehicles because of (1) the great distances and long times over which the reference system of a space vehicle must be maintained and (2) the fact that gyroscopes gradually drift away from the desired reference system if a "stable platform" type of reference is used.

Accelerometers and pendulums such as are used in inertial guidance systems are inoperative in the weightless environment of a space vehicle in unaccelerated flight, where an accelerometer will always read zero and a pendulum will assume a random position.

The current "state of the art" uses "inertial guidance" only for the "initial guidance," that is during the powered phase of the flight, since "inertial guidance" systems will only work during the powered flight phase.

"Midcourse guidance" and "terminal guidance" systems at the present "state of the art" for space vehicles, earth satellites and long range missiles are not satisfactory, if indeed they exist at all, as operational systems.

It is one of the objects of this invention to provide attitude orientation and navigational guidance from the beginning to the end of a flight through all three phases of "initial," "midcourse" and "terminal" guidance and where the entire flight can be "programmed" on the ground before launching and be immune to "jamming."

Vehicles orbiting around the earth above the atmosphere without use of power to maintain their orbit are maintained in it by "centrifugal" force balancing out gravitational force somewhat as the ball in a "Ball Bank" indicator remains centered when an aircraft makes a coordinated turn because of the effect of the resultant of "centrifugal" and gravitational forces.

In the case of the orbiting earth satellite its weightless environment makes devices slaved to the earth's gravitational field useless for control and guidance since for practical purposes gravity has been cancelled out by "centrifugal" force.

The other principal force field available for use as an earth reference for control and guidance is the earth's magnetic field. Fortunately, it is readily possible to balance out extraneous forces and accelerations as described previously by using balanced magnet units, leaving devices that will, as a practical matter, respond solely to the earth's magnetic field even while in the "weightless" environment of an orbiting earth satellite, long range missile, or "space ship" as such devices are not affected by gravity, "centrifugal" force or other accelerations.

Attitude orientation then becomes possible by using balanced magnet units, or the equivalent, to properly orient the vehicle about its roll, yaw and pitch axes using the earth's magnetic field to drive the sensing means with the earth as a reference.

Heading orientation may be achieved by use of magnet units, or the equivalent, as previously described.

Navigational guidance may be achieved by use of balanced magnet units, or the equivalent, and by using magnetic coordinates of latitude and longitude as an earth reference, measurable by utilization of the magnet units, "state of the art" instrumentation and concepts, and the proper method.

The present "state of the space art" teaches that the encircling belt of high-energy radiation ranges around the earth from at least 65 degrees north to about 65 degrees south latitude, with the radiation most intense in the equatorial region, reaching as much as 10 roentgens per hour—enough to deliver an average lethal dose in two days to an unshielded human being.

Thus the radiation hazard to vehicles launched and recovered near the magnetic poles would be much less than if they penetrated the radiation belt at lower latitudes.

It should be a relatively simple matter to guide an earth satellite on a polar orbit where it will pass over the North and South magnetic poles by means of magnetic guidance means as previously described.

It follows then that a manned space ship could be guided by magnetic navigation and orientation means to "ascend" and "descend" through the polar regions to escape the effects of the high energy radiation belt.

Extremely simple, light, inexpensive and reliable magnetic guidance systems could be used for attitude orientation and navigational guidance for long range missiles, earth satellite and space ships compared to existing "state of the art" systems. Attitude orientation and navigational guidance could be maintained through all three phases of (1) "initial," (2) "midcourse," and (3) "terminal" guidance.

Magnetic guidance systems to "home in" on a desired "target area" could be used where the basic information fed to the system to enable the vehicle to "pin point" the "target area" need only be the magnetic latitude and longitude of the "target area." This could readily be determined by actual measurement at the "target area" site so that possible anomalies in the earth's magnetic field en route would not seriously affect the "terminal guidance" of the magnetic guidance system.

As a practical matter local magnetic anomalies on the earth's surface tend to disappear at the altitudes used by space vehicles, leaving only gradual changes in the earth's magnetic field.

Substantially symmetrical lines of magnetic force appear to blanket the entire earth including the United States and Soviet Russia despite many misleading charts whose projection causes the magnetic lines of dip and variation over the United States to appear substantially symmetrical while those over Soviet Russia are depicted as very unsymmetrical.

A chart with a projection that places the observer over the North polar region should show that the lines of equal magnetic dip angle range out in navigationably usable symmetry from the North Magnetic Pole, even at the earth's surface and could reasonably be expected to become even more symmetrical at substantial heights over both Soviet Russia and the United States. Such a chart is published by the U.S. Naval Oceanographic Office, Suitland, Md., uses Azimuthal Equidistant Projection and is entitled, "The Magnetic Inclination or Dip," #1700N.

These lines of equal dip angle are synonymous with lines of equal magnetic latitude in magnetic navigation.

The same situation holds true for the lines of equal magnetic variation which are synonymous with lines of equal magnetic longitude in magnetic naviagtion. Such a chart is published by the U.S. Naval Oceanographic Office, Suitland, Md., uses Azimuthal Equidistant Projection and is entitled, "The Magnetic Grid Variation No. 1706GN." This chart shows magnetic grid-variation (grivation) lines extending in navigationally useable symmetry from the North Magnetic Pole outwards over Soviet Russia as well as Canada.

The proper use of magnetic charts such as these, preferably consolidated into accurate charts showing both magnetic latitude and longitude coordinates on the same chart, should make it possible to navigate vehicles such as space ships, earth satellites, missiles, submarines, aircraft and surface ships with reasonable accuracy almost anywhere on, over or under the earth's surface particularly if the magnetic coordinates at the desired destination were obtained by actual measurement instead of interpolation.

A continuous running "fix" could be provided regardless of visibility with such a system, and automatic navigation from virtually any point on earth to virtually any point on or over the earth regardless of visibility could be achieved by proper use of my invention.

Charts showing lines of equal magnetic grivation (grid variation) with Azimuthal Equidistant Projection are desirable for use in the polar regions instead of charts merely showing isogonic lines denoting variation (magnetic declination) in degrees as set forth in U.S. Naval Oceanographic Office Chart entitled, "The Variation of the Compass No. 1706N," because magnetic grivation lines resolve the confusion that would otherwise exist using magnetic isogonic lines in the polar regions due to the proximity of the poles (magnetic and true).

The embdiment of the invention illustrated by FIGURE 6 is generally similar to those previously described. Its casing 60 may be identical to the casing 20 but it has the mount 61 of the second element 62 located centrally of its upper part with the needle 63 depending. The magnet of the element 62 is indicated at 64 but as the element 62 may be, except for its position, substantially identical to the element 31, it is not shown in further detail.

The card 65, attached to the casing 60, is provided with indicia generally indicated at 66 and arranged arcuately to be traversed by the needle 63. It will also be noted that, adjacent the face plate 67, there is a series of directional indicia generally indicated at 68 with reference to which fingers 69, adjustably mounted on the plate lip 70, establish the desired operating limits of the instrument.

The card 65 also carries an accelerometer, generally indicated at 71 and having its transparent tube 72 with its center disposed downwardly. The center part of the tube 72 has rings 73 for use in centering the ball 74.

It will be appreciated that it is sometimes necessary to compensate, in a magnetically responsive instrument, for factors interfering with accuracy.

In accordance with the invention, effective compensation is made easy by means of a strap 75 encircling the casing 60 and provided with a threaded stem 76 having a ball and socket connection 77 therewith adapted to be locked by means of the nut 78. Threaded on the stem 76 is a nut element 79 carrying compensating magnets 80 which may be adjusted in various ways, as for example, as shown in Letters Patent No. 2,677,895. With this arrangement, the strap 75 may be shifted about the casing 60, the nut threaded towards or away therefrom with attendant variations in the angle of the magnets 80 with respect thereto, or the stem 76 may be swung into any desired position relative thereto within the limits of the connection 77.

In practice, there can be as many compensating magnet assemblies as are wanted to achieve the dual purpose of compensating for magnetic deviation in the aircraft or for changing the range of azimuthal operating limits for the instrument by moving the needle a suitable amount from center when the aircraft is headed South. Thus, a heading other than South can be achieved when the needle is centered in flight by the pilot, and the automatic pilot portion of the instrument can be effective over a different range in azimuth by merely moving the appropriate compensating magnet to the proper position to give the desired range. On a more sophisticated instrument, an azimuthal range adjusting magnet could be arranged to be manually operable in flight by the pilot so that he could change at will the heading range capabilities of the instrument when used as an integrated bank and heading indicator.

In connection with heading selections, reference is made to FIGURE 6C wherein there is shown an orientation instrument 60A similar to that shown in FIGURE 6 in that it has a mount 61A pivotally supporting the upper end of the needle 63A and its magnet 64A, with the lower end of the needle 63A traversing the indicia-bearing card 65A. In the instrument shown in FIGURE 6C, however, there is a magnet 80A mounted on the rotatable member 80B provided with a knob 80C enabling the magnet 80A to be turned into a position and to deflect the magnet 64A to a selected heading. The member 80B has a pointer 80D readable with an appropriate scale, not shown.

Reference is also made to the instrument shown in FIGURES 19–23 where there is shown an instrument 220 having a shaft 221 provided with a balanced needle 222 traversing a surface 223 having a center marker 224. The shaft 221 has a magnet 225 surrounded by coils 226 and 227 and housed in a copper shield 228, to provide dampening.

The coils 226 and 227 are deflection coils by which the magnet 225 may be deflected so that the needle 222 will indicate a selected heading.

By way of illustration, an adjustable and suitable calibrated dial 229 is operative to adjust the heading control 230 to cause needle deflection to match the selected heading. Calibration is effected as by turning rotatable member 231 to adjust the calibrating control 232.

It will be appreciated that the basic operating principles of the compensating mechanism shown apply either to a ground adjustable or a pilot operated device. Thus, compensating magnets can be used to cancel out magnetic deviation in the aircraft or introduce magnetic deviation in the desired amount, in the instrument. When compensating magnets are used to cancel out deviation the pointer should be centered with the wings level on a North or South heading, and if the aircraft is flown by centering the needle, it will end up on a Southerly heading in the Northern Hemisphere in straight and level flight.

When compsenating magnets are used to introduce controlled deviation, the pointer will be centered at some other heading than South or North. If the aircraft is then flown by centering the needle, it will still end up straight and level but on some other heading than South and the range in azimuth in which the instrument will provide integrated bank and heading guidance will have shifted. This extends the usefulness of the instrument to an experienced pilot or for unmanned devices.

On an instrument having opposing spiral hair-springs attached from each end of the shaft as shown in FIGURE 14, the pointer can be shifted off center for a Southerly heading by increasing or decreasing the spring tension of one of the springs by any means such as a screw adjustment as is common practice with electrical meters. This could also extend the operating range in azimuth for integrated bank and heading, manual or automatic guidance, for experienced pilots, or for unmanned devices.

In the embodiment of the invention illustrated by FIGURES 7–9, the case 81 houses a balanced magnet unit generally indicated at 82 and disposed with its needle 83 depending and provided with reverse bends to provide an intermediate part 84 extending forwardly through an arcuate slot 85 in the card 86 and a tip 87 disposed to traverse the arcuately arranged indicia 88.

It will be appreciated that, as with other embodiments of the invention, the "zero" marking represents a South heading and indicia to the left and right thereof represent, respectively, Easterly and Westerly headings. As with other embodiments, adjustable limits are provided. In the embodiment of the invention shown in FIGURES 7–9, there is a flexible element 89 mounted arcuately in the case 81 to be rotated as by the knob 90 and to be visible through the arcuate slot 91 in the card 86.

Centrally of the element 90 is the anchor sleeve 92 of a lazy tongs unit 93 having end sleeves 94 and 95 which are oppositely threaded as required by the oppositely threaded ends of the element 89. The unit 93 also has intermediate sleeves 96 and 97 which fit freely the element 89 and which are connected to the proximate sleeves by pairs of pivotally joined arms 98 each pivotally connected to an appropriate one of the sleeves. The pivotally joined ends of the arms 98 thus constitute reference markers whose spacing can be uniformly varied by turning the knob 90 in one direction or the other. These markers are readable with reference to the associated indicia and the proximate pair have their primary utility in determining limits where integrated bank and heading or automatic guidance is desired. The remote or outer markers are used directly by the pilot in determining limits. The two outer markers when properly set, show East and West headings. The two inner markers give Southeast and Southwest headings within which range the instrument can be used as an integrated bank and azimuth indicator or serve to generate the guidance signals for an auto pilot.

An accelerometer, generally indicated at 99, is attached at one end to the case 81 by a pivot 100 and its other end is slotted as at 101 so that the device 99 may be swung relative to the attaching screw 102. The device 99 comprises an approximately straight tube 103 in which a ball 104 is a rolling fit in the tube 103. It will be understood that the use of the approximately straight tube requires that the air speed to which the instrument has been adjusted or which is predetermined is maintained and that the pilot's feet are kept off the rudder pedals. In blind flight, at the predetermined speed, the ball or bubble is discriminating against accelerations about the pitch axis in favor of accelerations about the yaw axis. As has been set forth above, a balanced flight is indicated when the ball is between the ends of the tube.

The device 99 has a fixed nut 106 through which is threaded a screw 107 rotatably attached to the case 81 as at 108 and which has a gear 109 meshing with a worm 110 on the shaft 110ª which drives a counter 111 and which is rotatable in either direction by a knob 112. A marker 113 resiliently engages the shaft 110ª to be swung in one direction or the other thereby. A spring backed push button 114 engages the marker 113 to disengage it from the shaft 110ª thus to let it return to a normal centered position. In practice, rough settings are made by means of the counter 111 and precise adjustments are then made utilizing the marker 113. The tube 103 is to be tilted to predetermine a desired roll or bank angle of the craft as measured by the counter and scale digits. The arm 113 is so proportioned and supported that it maintains resilient operative engagement with the shaft 110ª and at the same time with the push button over the full length of the L–R scale. Straight flight can be indicated by the centered marker with push button centering for the original centering operation. Turns can then be made by offsetting the marker.

The embodiment of the invention illustrated by FIGURES 10–13 is one representing a multi-purpose instrument. Within its case 120, there is a generally indicated balanced magnet unit 121 arranged with its needle 122 in a depending position to traverse the arcuate indicia 123. The transparent face 124, carried by the rotatable bezel 125, has a marker 126 thus to establish an integrated instrument of the type before described enabling emergency recovery from unusual attitudes, or use as a steady compass.

A retaining ring 127 is attached to the front of the case 120 and rotatably supports a mount 128 carrying an accelerometer shown as comprising a cylindrical, approximately straight, transparent tube 129 in which a ball 130 indicates level flight when under straight and level flying conditions it is kept centered relative to centering lines 131. The mount 128 has an arcuate rack 132 with which a pinion 133 on the shaft 134 meshes. The shaft 134 is mounted in the ring 127 and has a knob 135 facilitating adjustments of the level and having a marker 136 readable with reference to indicia 137 thus to combine the advantages of the instrument of FIGURE 4 with that of FIGURE 1.

The mount 128 also supports an accelerometer in the form of a sensitive, level type of switch 138 such as a mercury switch so that whenever the ball 130 rolls in its approximately straight tube 129, the mercury moves to close either of the leads 139 and 140, see FIGURE 13, to servo means such as the double acting, rotary solenoid 141 by which the aileron trim tab 142 is raised or lowered thus to maintain automatic control of the lateral attitude of the aircraft. Such auto-pilot control is all that is necessary since aircraft will automatically maintain the longitudinal attitude they have been trimmed for, provided the wings are kept level, due to the natural aerodynamic stability built into normal aircraft. The amount of current flowing to the solenoid 141 from the switch controlled source 143 can be regulated as by means of a rheostat 144 to control the speed of response.

The instrument detailed in FIGURES 10 and 11 is also adapted to enable the magnet 145 of the balanced magnet unit 121 to generate signals that are attitude and heading sensitive and proportional to the amount of correction required and that can be used to cause the aircraft to recover from an unusual attitude and maintain controlled flight on known headings.

While any desired system of signal pickoff can be used that does not overload the unit 121 so that its needle 122 is not sufficiently responsive, the means shown in FIGURE 11 place no load thereon. The pivot shaft 146 of the unit 121 is shown as carrying a rectangular plate 147, see FIGURE 12, of a high dielectric material. The plate 147 is normally halfway between the metal plates of two fixed capacitors 148 and 149 joined by a common metal plate 150 when the needle 122 is centered.

When the needle moves off center, the capacitance of the balanced capacitators 148 and 149 is changed with one increasing and the other decreasing in capacitance amounts proportional to the off-center movement of the needle 122.

The proportional correction signal is fed by leads 151 and 152 into a balanced conventional bridge circuit 153 provided with means enabling its balance to be adjusted so that any heading within the limits of the system can be flown.

The output from the bridge circuit 153 is fed into an amplifier unit 154 and to a servo 155 via a speed control rheostat 156. The servo 155 may be a double acting, rotary solenoid operatively connected to selected control or controls such as the rudder or ailerons, the latter being generally indicated at 157.

In use, the marker 126 is set to any desired heading within the limits of the instrument with the approximate headings being those indicated at 123. The exact heading would usually be determined from the regular magnetic compass after it had settled down in level flight and the marker 126 would then be re-set as indicated thereby. For manual flight, it is only necessary for the pilot to keep the needle 122 lined up with the marker 126. In automatic flight, the bridge circuit 153 would be adjusted to be in balance when the needle and the adjusted marker 126 were lined up.

In the embodiment of the invention illustrated by FIGURES 14 and 15, there is shown an instrument for giving warning automatically if the aircraft gets into an unusual attitude and by which recovery may be made.

The instrument of FIGURES 14 and 15 has a case 160 in which there is a generally indicated balanced magnet unit 161 having its needle 162 disposed to traverse the arcuately arranged indicia 163 on the card 164. Contact arms 165 and 166 are pivotally supported by the transparent face 167 of the instrument and these have levers 168 and 169, respectively, enabling them to be swung into desired relationship to the centered position of the needle 162 and to their stops 170. The instrument is operative to give tilt or off-heading warnings when the battery switch 171 is closed.

In this embodiment of the invention, the needle 162 is a contact and it is necessary to connect it to the power source without interference with its primary function. To accomplish this result, there are shown oppositely spiralled springs 172 and 173 of which the spring 172 is part of the lead 174. Capacitor couplings or direct couplings may be used if no appreciable mechanical interference results.

When the needle 162 engages either one of the contact arms 165, 166, an appropriate one of the leads 175, 176 is closed to the sensitive relay 177 as illustrative of means by which relatively small inputs can trigger relatively large amounts of electricity through the lead 178 or the lead 179 to the double acting servo 180 by which the control 181, an aileron or rudder trim tab, for example, is actuated as desired. A rheostat 182 enables the rate of recovery to be adjusted.

In practice, a lead 183 to a warning light 184 is closed when the lead 175 is closed and a lead 185 to the warning light 186 is closed when the lead 176 is in circuit. As examples of other warning means, there is shown an element 187 which may be a horn, stick-shaker, or the like, in a circuit 188 closed whenever the sensitive relay 177 is operated and having a manually operated control switch 189.

It will be appreciated that the auto-pilot circuit has a manually operated switch 190 so that if the plane were being manually piloted, it could be closed by any other crew member if anything happened to the pilot.

A switch controlled lead 191 places headphones 192 and loud speakers 193 into circuit with audio signal generators 194 and 195. The generator 194 is operative when the lead 175 is closed and generates a series of high pitched dots while the generator 195 is operated when the lead 176 is closed and generates a series of low pitched dashes.

The lead 196 has a switch 197 and includes an automatic pilot control and relay box 198. The lead 196 is connected to the lead 188 when both the switch 189 and the switch 197 are closed. When contact is then made by the arm 162 with either one of the contact arms 165, 166, the device 198 is energized, bringing into operation the auto-pilot 199 until the switch 197 is again opened. When this basis of operation is wanted, the contact arms 165 and 166 are usually positioned far apart.

When the adjustable contact arms are properly positioned, certain headings can be flown and control of the aircraft maintained simply by operating the aileron or rudder in response to the aural signals. Thus, survival is possible even though the pilot has become temporarily blinded. Except for the embodiment of the invention shown in FIGURES 3 and 5, the instruments shown as described have been designed for use in the Northern Hemisphere, where the North seeking end of the magnet should be down. For instruments for use in the Southern Hemisphere, the South seeking end should be down, and the dial calibrations changed to reflect the generally Northerly headings that would result from the use of the instrument as an integrated attitude and azimuth indicator or auto-pilot in the Southern Hemisphere.

A special condition exists when crossing the magnetic equator headed North or South. Ordinarily, in such a relatively unlikely situation, the lines of force of the earth's magnetic field are horizontal with the earth and parallel to the pivoted shaft of the balanced magnet unit. As long as this is true, the instrument becomes inoperative and the balanced magnet unit acts as though it had lost all its magnetism and might point in any random direction.

As a practical matter, the ordinary aircraft magnetic compass loses its so called "Northerly Turning Error" in the same situation and thus becomes available for use as a "blind flight instrument" to tide the situation over for such a hypothetical situation. However, if attitude and azimuth guidance is required from this invention during such a situation, it can be had very simply by inclining the balanced magnet unit in the instrument with respect to the earth in a fore-and-aft direction. In turn, this can be achieved by inclining just the balanced magnet unit, the instrument, or the entire aircraft.

With this invention what amounts to an Artificial Horizon instrument is created that gives attitude information sufficient to control the aircraft in the immediate area or even directly over or near the Poles where conventional compasses become useless. Instruments in accordance with the invention will give directional guidance nearer to the Magnetic Poles than conventional magnetic compasses.

From the foregoing, it will be appreciated that instruments, in accordance with the invention, have many marked advantages for they afford, for the first time, a basis of flying an aircraft "blind" without requiring gyro instruments or other power operated instruments. The instruments enable recovery from unusual attitudes to straight and level flight in a known heading with a minimum of training and skill and they are simple, accurate, and reliable. At the same time, they are equally well adapted for use in automatic pilot and blind flight systems. Passive guidance systems may be built around them that employ available data to give the magnetic equivalents of Latitude and Longitude of a desired location.

The invention also provides a method of and apparatus for use in obtaining true vertical orientation in the lateral axis and fore-and-aft pitch orientation in the longitudinal axis which is not affected, as a practical matter, by accelerations of a prolonged nature that adversely affect the erecting mechanisms of vertical gyro attitude instruments and in addition requires no power, in the usual sense, for its operation.

Such an instrument in accordance with the invention employs a balanced magnetic instrument, such as that shown in FIGURE 1, for example, mounted with needle moving laterally, to provide means to enable the vehicle to stabilize on an equatorial heading (approximately South in the Northern Hemisphere) for reasons previously described. The needle of the instrument would then indicate the true vertical laterally considered.

Longitudinal pitch orientation by magnetic means as part of my blind flight without gyros method and apparatus is an alternate means of maintaining or regaining pitch control of an aircraft, or other vehicle, when used with the proper method, apparatus and headings.

My preferred apparatus consists of a unit 20A which may be similar to the instrument shown in FIGURES 1 and 2, see FIGURE 6B, including a balanced magnet unit mounted in the same manner as that of my orientation instrument. The needle of that unit is indicated at 30A. The unit 20A has a dial 27A having a central index marker 29A and is marked in degrees of pitch either side thereof. The unit 20A is rotatably mounted in a support 22A and is vertically mounted with its balanced magnet unit and attached needle 30A swinging in a fore-and-aft direction along the longitudinal center line of the aircraft.

With such an instrument longitudinal pitch is determined as follows:

Step 1. While maintaining straight and level flight on a North or South heading, rotate the instrument 20A in its support 22A until the needle 30A is aligned with its central dial marker 29A. This represents zero degrees pitch on that heading.

Step 2. The needle 30A will indicate "up" or "down" pitch as long as that heading is maintained (without being affected by accelerations such as those due to increased or decreased airspeed).

Step 3. To recover from an "unusual attitude" such as a "graveyard spiral dive," the instrument should be preset at zero pitch on a South heading.

Step 4. When the spiral dive occurs the needle of the orientation instrument should be centered with the aileron control and then the needle of my Magnetic Pitch indicating instrument should be centered with the elevator control. The aircraft will: (a) roll upright (if inverted), (b) turn to a heading of South, (c) level off in straight and level flight on a South heading with Bank, Turn, Roll and Heading changes monitored and correctable by reference to the orientation instrument and longitudinal pitch monitored and correctable by reference to my magnetic pitch indicating instrument.

Step 5. Keeping the needles of the two magnetic instruments centered will keep the aircraft in this stable heading and attitude configuration. From time to time it may be necessary to readjust the zero pitch setting by rotating the instrument inside its housing as required. This should not interfere with the use of the instrument as a means of recovering from unusual attitudes in combination with my orientation instrument, or for normal flight.

Since the magnetic "pitch" or direction of the lines of force of the earth's magnetic field at any locality is also the Magnetic Latitude of that locality and is shown on state of the art magnetic charts as isoclinic or isoclinal lines, I have found that my magnetic pitch indicating instrument can be used to determine magnetic latitude over the earth and also serve as a passive substitute for conventional distance measuring equipment that is currently too expensive, heavy and cumbersome for most aircraft, when used with the proper method on flights proceeding in generally North–South or South–North directions by suitable apparatus modifications.

My preferred apparatus for accomplishing this result requires that support 22A be suitably calibrated in degrees with 90 at the top and 0 at right angles to it as shown in FIGURE 6B. This corresponds to state of the art isoclinal line markings on isoclinic charts showing magnetic latitude as isoclinal lines in degrees. The support itself is adjustable for fore-and-aft tilt with respect to the aircraft by means of the arcuate slots 27B and the locking screws 27C. A fore and aft level 37A is affixed to the support 22A for the purpose of aligning the 90 degree calibration mark with the earth vertical while in unaccelerated flight by loosening the locking screws and rotating the housing 22A until the bubble or ball of the level is centered.

In distance measuring, the following procedure is practiced:

Step 1. Stabilize aircraft on desired North or South heading, such as by use of either or both of my other blind flight without gyros methods and instruments so that the 90 degree isoclinal calibration mark on the housing 22A is aligned with the local gravity vertical, after stabilized flight has been attained.

Step 2. Rotate the unit 20A until its dial marker 29A is aligned with the appropriate isoclinic calibration mark on the support 22A that represents the isoclinic line value in degrees of the place to or from which it is desired to measure distance. This numerical value in degrees can be readily found by use of a suitable chart such as "Isoclinic Chart, United States," published by the U.S. Coast and Geodetic Survey.

Step 3. The distance to the destination set into my magnetic distance measuring instrument is now shown by the dial reading of the unit 20A, where the number of degrees away from marker 29A indicated by the needle 30A is the distance to the destination expressed in degrees of isoclinal latitude. This value is readily converted into miles by use of an isoclinal chart if desired, but it may not be necessary since use of isoclinic degree numbers should be less confusing than miles, once aviation personnel become accustomed to such use.

For example, an aircraft flying on an instrument flight plan from Boston, Massachusetts (73.5 isoclinic degrees), to Miami, Florida (59.7 isoclinic degrees), could give a reasonably accurate position report in terms of distance traveled and distance remaining by giving the appropriate "isoclinic" data. This could be in the form of isoclinic distance remaining to the destination or the "isoclinic degree number" anywhere along the route, both of which could be readily found with my magnetic distance measuring instrument.

Step 4. The needle 30A of the instrument will then continuously indicate the distance remaining in terms of isoclinic degrees and will read zero degrees from marker 29A when over the destination by this preferred method.

It is not necessary that a flight proceed along a North or South route provided parallels of isoclinal latitude are traversed and due allowance for the slant line distance is made by observing the chart. To enable such slant line navigation, conventional dead reckoning or other aids such as radio can be used. When an "isoclinal position" is desired the aircraft should be turned momentarily until the aircraft is on a magnetic North or South heading to determine the "isoclinal reading" (whichever the instrument was initially set for) and then turned back on course. When on a South heading the initial "isoclinal setting" of the instrument will be forward of the 90 degree mark on the housing and the needle will move forward as the flight progresses. When on a North heading the initial "isoclinal setting" will be aft of the 90 degree mark on the housing and the needle will move backwards as the flight progresses. A magnetic beam following instrument is shown in FIGURES 17 and 18 and is for use in following "Magnetic Beams" generally referred to as isoclinal or isoclinic lines of equal magnetic latitude. "Isoclinic Charts" showing these lines and giving the proper numeral values to these lines are readily obtainable and these isoclinic lines blanket the earth in symmetrically useable configurations. They run in a generally East–West direction and my instrument and method utilize these isoclinal lines as passive magnetic beams that can be intercepted, identified and followed to a desired destination using passive apparatus and methods. Thus neither the "beams" or the "beam" following equipment can be "jammed" or made inoperative by man made interference outside the aircraft (or other vehicle) using them.

My magnetic beam follower instrument is shown as consisting of a generally indicated balanced moving magnet unit 320 similar to my basic orientation instruments supported by transverse pivots 321 in a yoke 322 enabling the balanced magnet unit 320 to be rotated in azimuth relative to its base 323, so that it can be used in much the same fashion as conventional radio direction finding loops. To that end, the base 323 has a rotatable dial 324 provided with suitable graduations. As the instrument is to be levelled after the aircraft has achieved stabilized, unaccelerated flight, the unit 320 is provided with a level 325.

To intercept, identify and follow an isoclinal line of magnetic latitude, which I regard as a "Magnetic Beam," my method embraces the following steps:

Step 1. The aircraft should be flown in a generally magnetic North or South direction until in the vicinity of the desired isoclinal line.

Step 2. To make an "intercept" my magnetic beam follower instrument is leveled and rotated in azimuth until the needle 320A of the unit 320 swings fore-and-aft (with the aircraft in stabilized, unaccelerated flight).

Step 3. The aircraft should be headed due magnetic North (or South) and the needle indication watched closely.

Step 4. When the needle is aligned with the degree number on the dial 320B of the unit 320 that corresponds with the desired isoclinal line an "intercept" has been made.

Step 5. The aircraft should be turned to an East or West heading (depending on the direction desired).

Step 6. The unit 320 should then be rotated 90 degrees in azimuth so that its needle swings transversely in a vertical plane and the "zero" reference marker of the graduations on dial 324 is centered relative to the reference marker 323A.

Step 7. The needle 320A of the unit 320 should now be approximately aligned with the desired isoclinal degree calibration mark on the dial 320B, which represents the "Magnetic Beam."

Step 8. Checks should be made at suitable intervals as to the needle position and suitable corrections made in the heading as required to keep the needle at the desired indication.

Step 9. The needle "read out" will be on the left lower side of the dial 320B when heading East and to the right lower side of the dial heading West. If the needle drifts to the left of the desired position, while on an Easterly heading it indicates the aircraft is South of the desired "track" or "beam" and vice versa. If the aircraft is flying West the sensing of the needle is reversed. This can easily be remembered by realizing that the needle wants to move further away from the vertical 90 degree calibration mark if the aircraft is South of the desired isoclinal line when a generally East or West course is flown.

Step 10. If the needle shows the aircraft is "off the beam" to the South, the East or West heading should be shifted a few degrees to the North and vice versa until it becomes possible by a "bracketing" technique to arrive at the proper heading to keep "on the beam."

Step 11. Although the proper heading to keep "on the beam" may be a few degrees either side of East or West, whenever it is desired to check "beam alignment" the aircraft should be headed due East or West (magnetic) when making this check of needle alignment, or the unit 320 should be offset in azimuth the amount the aircraft's heading is offset from East or West, so that the magnet unit 320 is swinging due North and South (Magnetic).

Step 12. Offsetting the magnet unit 320 in the proper direction can readily be accomplished by using the scale on dial 324 which is calibrated in degrees of azimuth and referring to the magnetic compass for the amount and direction to make this offset correction. For example if a heading of 260 degrees had to be flown to stay "on the isoclinal beam" flying in a Westerly direction, then the magnet unit 320 should be rotated in azimuth 10 degrees to the right to keep its needle swinging North and South as required for accurate readings of isoclinal latitude.

Using these basic principles an automatic vertical finder could be made where the first balanced magnet unit could be automatically positioned to its stable equatorial heading by banking the entire vehicle as shown and described elsewhere. Or, with reference to FIGURE 12, 155 could be considered a servo motor that "banks" and rotates the instrument in azimuth until the center marker of the instrument is lined up with the needle in much the same way that the well known automatic direction finder servo motor rotates a loop antenna until a needle points to the transmitting station.

When the vehicle or instrument is thus positioned in its appropriate equatorial stable direction, the needle of this first magnet unit indicates the true lateral vertical automatically.

My invention also relates to magnetically controlled "stable platforms" where a "platform" is maintained in stable equilibrium by means of units, including balanced magnet units generally similar to my orientation instruments, which furnish the necessary signals for platform stabilization through servos, etc. Such instruments are for such uses as stable verticals or horizons, auto pilots and devices for maintaining fixed positions with respect to the local earth vertical or the local direction of the lines of force of the earth's magnetic field.

In this embodiment of my invention, there is a combination of single-degree-of-freedom balanced magnet units with servo means operating on a controlled element, with the servos being actuated by the amplified deflection signals of the magnet units and having their output connected to the controlled element in a manner to tend to restore the moving magnet units to their original position. By this arrangement, the magnet units are called upon to deliver energy at only a signal level, while the energy required for moving the controlled member is furnished by the servomechanisms. Since the moving magnet units are never required to deflect in their suspension by more than a relatively small angle, effects due to magnet "reversals" are avoided. When the single-degree-of-freedom moving magnet units are used in proper combination without control torques, the "magnetic platform" will hold a reference to the local direction of the lines of force of the earth's magnetic field. But by the use of suitable reference or control torques on the magnet unit used for pitch, a fixed position with respect to the earth may be maintained and hence a stable earth vertical and a stable earth horizontal plane may be maintained. Such a gravity reference may be provided by use of a level type device such as is shown at 138 in FIGURE 10 used with a circuit such as shown in FIGURE 13. This gravity reference signal could be used through suitable servo action to rotate the fore-and-aft swinging magnet unit mechanism in its housing as shown in FIGURE 16 so as to correct for the gradual decrease in inclination of the lines of force of the earth's magnetic field experienced when traveling from a magnetic pole towards the magnetic equator.

In FIGURE 16 a moving single-degree-of-freedom balanced magnet unit 420 mounted on a platform in the form of a gear 421 is provided with electrical contacts 422 and 423. When the needle 420A is displaced from its desired central position, an electrical circuit is completed which actuates a servo motor 424 in the proper direction (through conventional circuitry such as an amplifier or relay) to rotate the platform 421 by means of the gear 425 so as to correct the displacement of the needle 420A. Another similar single-degree-of-freedom balanced magnet unit is shown at 426 as mounted, above the unit 420, by transverse pivots 427 in a supporting yoke 428 fixed on the unit 420. The position of the unit 426 is such that magnet 426A swings in a vertical plane at right angles to the plane in which the needle 420A swings. A suitable electrical pick off mechanism is provided that can consist of contact points or other means such as the variable capacitor arrangement 429, or suitable coils with associated circuitry. The signal thus derived from balanced magnet unit 426 is used through suitable means such as an amplifier or relay to drive the servo motor 430 provided with a gear 431 meshing with the gear 432 fixed on the base 433 thereof to tilt the unit 420 back at the desired stable position in fore-and-aft pitch.

A third servo motor 434 can be driven from a gravity operated reference such as the liquid pitch sensitive level switch 435, fixed to the platform base 433 for example, to provide a reference torque to position the second magnet unit 426 in pitch as by means of the motor driven gear 436 in mesh with a gear 437 fast on a pivot 427 thus to enable the moving magnet 426A to align itself in its neutral position with the local direction of the lines of force of the earth's magnetic field and thus to enable the stable platform to be slaved to the earth's gravitational field. The speed and gear reduction of the servo motor 434 can be made so that the gravity produced torque correction can be of a long "period" or duration. Thus accelerations of relatively short duration will have negligible effect on the moving pitch magnet alignment, while accelerations of long duration, such as due to the changing slant angle of the earth's magnetic field, will result in reasonably rapid correcting torque action to automatically compensate for the change in the slant angle of the earth's magnetic field.

The present invention, accordingly, meets the requirements of a system and apparatus divided in two parts with one part involving a method and instruments of recovering rapidly and reliably from unusual attitudes caused by spatial and directional disorientation of the pilot to straight and (wings) level flight on a known heading using a method and apparatus that would be extremely easy to use under emergency conditions and would not involve excessive loss of altitude, high "g" loadings, reliance on a power supply, should not be affected by icing, should work well upside down and offer a reliable and easily understandable reflex action reference indication to enable recovery from "out of control" situations quickly. My magnetic "stand-by aircraft flight earth reference" instrument is fast, efficient, simple, small, lightweight, inexpensive and above all, reliable for pilot's spatial and directional orientation in an emergency, and the usual orientation cycle is to (1) roll right side up, if inverted, (2) turn to a known heading, and (3) recover to straight and wings-level flight on the known reference heading.

In addition, the second part relates to a basic system of blind flight and includes suitable methods and instruments for flying blind on desired headings, making climbs, descents, approaches, turns and ways of navigating a desired destination, distance measuring and determining LOP's (Lines of Position) by passive means without external visual reference, and obtaining directional heading information without being affected by Northerly Turning Error or centrifugal force in a turn.

The magnetic instruments or the accelerometer can be used separately with the proper related method to maintain control of an aircraft under instrument conditions, but their capabilities supplement each other so that, when combined, a complete blind flight and navigation system having extreme reliability and versatility is created, including a magnetically controlled "stable platform," and passive guidance means and related methods adapted for use in earth satellites, missiles, space vehicles, ships, and submarines, as well as aircraft, that do not require exact knowledge of the geographical starting position, or outside visibility, with errors due to transit time being negligible.

I claim:

1. In an instrument for use in bank, turn, roll and heading control, first, second and third elements of which the first is to be fixed relative to the air or other craft to be controlled, said second element including a pair of supports and a balanced magnet unit between said supports and pivotably connected thereto and free to move only at right angles to the pivot axis, said second element being connected to the first element with said unit free to move in a transverse plane with respect to the craft when the first element is so fixed; said third element being a level type indicator of the ball or bubble type and including an approximately straight transparent tube, said third element also being attached to the first element whereby movement of either the magnet unit or the ball or bubble from a predetermined relation to said first element indicates bank or turn correctable by re-establishing said predetermined relation.

2. In an instrument for use in bank, turn, roll and heading control, first, second and third elements of which the first is to be fixed relative to the air or other craft to be controlled, said second element including a pair of supports and a balanced magnet unit between said supports and pivotably connected thereto and free to move only at right angles to the pivot axis, said second element being connected to the first element with said unit free to move in a transverse plane with respect to the craft when the first element is so fixed; said third element being a level type indicator of the ball or bubble type and including an approximately straight transparent tube, means attaching said third element to said first element, said means being adjustable to tilt said tube relative to said first element, movement of either the magnet unit or the ball or bubble from a predetermined relation to said first element indicating a bank or turn correctable by re-establishing said predetermined relation.

3. In combination a vehicle such as an aircraft having a fore-and-aft axis, and a self-contained instrument for use in bank, turn, roll and heading control, said instrument including first and second elements pivotably interconnected for relative movement in a predetermined plane, said first element being fixed relative to the air or other craft to be controlled with said plane transverse relative to the fore-and-aft axis of said craft, said second element being a magnet unit balanced to be non-responsive to acceleration, as such, whereby movement of said second element from a predetermined relation to said first element, indicates a bank or turn and is actuated by the earth's magnetic field.

4. In combination a vehicle such as an aircraft having a fore-and-aft axis, and a self-contained instrument for use in bank, turn, roll and heading control, said instrument including first and second elements pivotably interconnected for relative movement in a predetermined plane, said first element being fixed relative to the air or other craft to be controlled with said plane transverse relative to the fore-and-aft axis of said craft, said second element being a magnet unit balanced to be non-responsive to acceleration, as such, whereby movement of said second element from a predetermined relation to said first element, indicates a bank or turn and is actuated by the earth's magnetic field, and a pair of contacts between which said magnetic unit is located and which serve as stops to limit its movement, said magnet unit also being a conductor thereby to function as a switch.

5. In combination, a vehicle and a self-contained instrument for use in bank, turn, roll and heading control, said instrument comprising first and second elements pivotably interconnected for relative movement in a predetermined plane, said first element being fixed relative to the vehicle with said plane transverse relative to the fore-and-aft axis of said vehicle, said first element having indicia representing directions in azimuth and a central marker, said second element being a magnet unit balanced to be non-responsive to acceleration, as such, whereby movement of said second element from a predetermined relation to said first element, when said first element is so fixed, indicates a bank or turn and is actuated by the earth's magnetic field, and a third element rotatably supported with reference to said indicia and said unit to indicate level flight when the heading is other than represented by said central marker and to provide variable headings without "Northerly Turning Error."

6. In a self-contained instrument for use in bank, turn, roll, and heading control, first and second elements pivotably interconnected for relative movement in a predetermined plane, said first element to be fixed relative to the air or other craft to be controlled with said plane transverse relative to the fore-and-aft axis of said craft and being provided with directional indicia, said second element being a magnet unit balanced to be non-responsive to acceleration, as such, and movable relative to said indicia whereby movement of said second element from a predetermined relation to said indicia, when said first element is so fixed, indicates a bank or turn and is actuated by the earth's magnetic field, said first element being provided with a lazy tongs unit including a central anchor part and two pairs of movable parts, one pair on each side of said anchor part, a rotatable member, said rotatable member and one movable part of each pair being threaded together to cause equal but opposite movement thereof, and two pairs of arms between each two parts, the arms of each pair being pivotally joined at one end to corresponding arms of the other pair and at their other ends to an appropriate one of the proximate parts, the interconnected ends of the pairs of arms constituting markers readable with reference to said indicia, thus giving four equally spaced markers at all times with adjustments of one being attended by adjustments of the others.

7. In a self-contained instrument for use in bank, turn, roll, and heading control, first and second elements pivotably interconnected for relative movement in a predetermined plane, said first element to be fixed relative to the air or other craft to be controlled with said plane transverse relative to the fore-and-aft axis of said craft, said second element being a magnet unit balanced to be non-responsive to acceleration, as such, whereby movement of said second element from a predetermined relation to said first element, when said first element is so fixed, indicates a bank or turn and is actuated by the earth's magnetic field, and means including a support, a universally adjustable connection between said support and said first element to which said support is threaded for movement towards and away from said unit in parallel planes, and at least one magnet adjustably connected to said support.

8. In a self-contained instrument for use in bank, turn, roll, and heading control, first, second and third elements of which the first is to be fixed relative to the air or other craft to be controlled and has indicia including a central marking, said second element including a pair of supports and a balanced magnet unit between said supports and pivoted thereto to be free to move only at right angles to the pivot axis, the movement of said unit being in a transverse plane with respect to the craft when the first element is so fixed; said third element being a level type indicator of the ball or bubble type and including an approximately straight transparent tube, means adjustably connecting said tube to the first element, movement of either the second or third element from a predetermined relation to said first element indicating a tilt or turn correctable by re-establishing said predetermined relation, said adjusting means including a rotatable member, a counter driven by said rotatable member, and an arm with reference to which said indicia are readable, said arm being resiliently engaged with said rotatable member and having a normal position in registry with said central marker, and push button means for disengaging said arm from said rotatable member, for centering purposes.

9. In combination, a vehicle, such as an aircraft, said vehicle having a fore-and-aft axis, means sensitive to transverse or yaw accelerations and relatively insensitive to fore-and-aft and vertical accelerations, and a magnet unit pivotally mounted in said vehicle to swing only in a plane at right angles to said axis and balanced to discriminate against normal accelerations encountered in flight, whereby movement of the unit from a predetermined position indicates a bank, turn, or heading and is actuated by the earth's magnetic field.

10. In combination, a vehicle such as an aircraft, said vehicle having a fore-and-aft axis, first and second instruments each including a first element provided with a pair of spaced supports and a center marker, and a second element in the form of a balanced magnet unit between said supports and pivotably connected thereto for movement only in a plane at right angles to the pivot axis and with reference to said marker, said second element of the first instrument being free to swing only in a plane at right angles to the fore-and-aft axis of the vehicle whereby the second element discriminates against normal flight accelerations so that its movement from a predetermined relation to said first element indicates a change from that relation in bank, turn, or change in heading, said movement being actuated by the earth's magnetic field, and the second element of the second instrument being free to swing only in a vertical plane in parallel with said fore-and-aft axis thereby to be responsive to the earth's magnetic field to indicate relative longitudinal pitch.

11. In a self-contained instrument to be mounted in a vehicle such as an aircraft having a fore-and-aft axis, said instrument including first and second elements, said first element being attachable to said vehicle, said second element being in the form of a balanced magnet unit pivotally mounted in said first element to swing only in a plane transverse relative to the fore-and-aft axis of said craft, and having a predetermined position in a predetermined heading, and magnetic means attached to said first element and adjustable relative thereto to provide said position of said unit in other headings.

12. In a self-contained instrument to be mounted in a vehicle such as an aircraft having a fore-and-aft axis, said instrument including first and second elements, said first element being attachable to said vehicle, said second element being in the form of a balanced magnet unit pivotally mounted in said first element to swing only in a plane transverse relative to the fore-and-aft axis of said craft and having a predetermined position in a predetermined heading, an adjustable heading indicator, and means operable by said indicator to deflect said magnet unit to provide said position of said unit in other headings.

13. In a self-contained instrument to be mounted in a vehicle such as an aircraft having a fore-and-aft axis, said instrument including first and second elements, said first element being attachable to said vehicle, said second element being in the form of a balanced magnet unit pivotally mounted in said first element to swing only in a plane transverse relative to the fore-and-aft axis of said craft and having a predetermined position in a predetermined heading, an adjustable heading indicator, and means operable by said indicator to deflect said magnet unit to provide said position of said unit in other headings, said means including a circuit including magnet affecting coils and current regulating means connected to said indicator and operable in relation to the adjustment thereof.

14. In a magnetically controlled stable platform, a support, a pair of magnet units balanced against accelerations and mounted on said support to swing in vertical planes at right angles to each other, one plane being magnetic North–South and the other plane being magnetic East–West, means defining a null position for each magnet with respect to said support and detecting its deviations therefrom, means connecting said support to said platform for motion about two axes at right angles to each other, one axis providing motion in azimuth, means responsive to the detection of deviations of the East-West swinging magnet to effect such motion in azimuth, and means responsive to the detection of deviations of the North–South swinging magnet to effect motion with respect to said other axis and indicating means to alter the null position of the North–South swinging magnet as required to slave the platform to the earth's gravitational field.

15. In the recovery of an aircraft from "unusual attitudes," and in blind flight without gyros, the steps of nulling the transverse component of the earth's total magnetic field by orienting the aircraft azimuthally so as to center a transversely swinging magnet unit balanced against responding to accelerations; and then actuating the elevator controls to maintain, in a predetermined relation to the vertical, a magnet unit balanced against accelerations and swinging in a longitudinal vertical plane.

16. In the recovery of an aircraft from "unusual attitudes," and in blind flight without gyros, the steps of nulling the transverse component of the earth's total magnetic field by orienting the aircraft azimuthally so as to center a transversely swinging magnet unit, balanced against responding to accelerations; and then stabilizing motion about the pitch axis by conventional means.

17. In the recovery of an aircraft from unusual attitudes and in blind flight without gyros, the steps of controlling and integrating roll, bank, turn and heading by orienting the aircraft azimuthally so as to center a transversely swinging magnet unit balanced against responding to accelerations by banking toward the unit; and controlling pitch by actuating the elevator to maintain a steady air speed.

18. In combination, for use alternatively in blind flight and magnetic navigation, a vehicle, such as an aircraft, having a fore-and-aft axis, a first magnet unit pivotally mounted in said vehicle to swing only in a first vertical plane at right angles to said axis, a second magnet unit pivotally mounted in said vehicle to swing only in a vertical plane at right angles to said first plane, and indices, one for each magnet unit and positioned in the aircraft as a reference for determining movement of that magnet unit relative to the vehicle in response to the earth's magnetic force exerted in the plane in which the magnet unit may swing.

19. The combination of claim 18 in which the magnet units are mounted on a support and the support is pivotally mounted in the vehicle with its pivot axis vertical with respect to the fore-and-aft axis.

20. In combination, an aircraft having a pitch axis, an instrument including a marker and a balanced magnet unit free to swing with reference to said marker in one plane and a mount having a part fixed in said aircraft and a dial ring part rotatable relative to the fixed part about the pitch axis and having a series of graduations calibrated in degrees, said instrument being supported by said rotatable part for rotation independently of said rotatable part with the pivot axis of the magnet unit concentric with the axis of said rotatable part, thereby to enable said series of graduations to be adjustable relative to the aircraft about the pitch axis and the instrument marker to be adjustable relative to the series of graduations.

References Cited by the Examiner

UNITED STATES PATENTS

| | | | |
|---|---|---|---|
| 774,693 | 11/1904 | Peterson | 33—204.62 X |
| 1,306,882 | 6/1919 | Clarke. | |
| 1,533,683 | 4/1925 | Abbot | 33—222.6 |
| 2,054,318 | 9/1936 | Gunn | 33—225 |
| 2,165,894 | 7/1939 | Hohndorf | 73—498 |
| 2,306,373 | 12/1942 | Belden | 33—206 |
| 2,311,637 | 2/1943 | Buchanan | 73—517 X |
| 2,371,626 | 3/1945 | Kecskemeti | 73—517 X |
| 2,487,047 | 11/1949 | Farnham | 33—222.6 X |
| 2,541,213 | 2/1951 | Davidson | 33—222.6 X |
| 2,637,273 | 5/1953 | Stokes et al. | 73—514 X |
| 2,770,890 | 11/1956 | Bellon et al. | 33—222.5 |
| 2,771,779 | 11/1956 | Schaffer et al. | |
| 2,888,752 | 6/1959 | Lawson | 33—204 |
| 3,023,617 | 3/1962 | Statsinger. | |
| 3,087,333 | 4/1963 | Newell. | |

FOREIGN PATENTS

| | | |
|---|---|---|
| 856,482 | 3/1940 | France. |
| 302,586 | 9/1919 | Germany. |
| 455,437 | 2/1928 | Germany. |
| 7,737 | 1838 | Great Britain. |

ROBERT B. HULL, *Primary Examiner.*